US009266017B1

(12) United States Patent
Parker et al.

(10) Patent No.: US 9,266,017 B1
(45) Date of Patent: Feb. 23, 2016

(54) VIRTUAL PLAYBOOK WITH USER CONTROLS

(75) Inventors: Jason Parker, Winter Garden, FL (US); Kevin Kralian, Maitland, FL (US); Rob Moore, Longwood, FL (US); Kevin Proctor, Orlando, FL (US); Tommy Jacob, Deltona, FL (US); Hitoshi Nishimura, West Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 1030 days.

(21) Appl. No.: 12/630,768

(22) Filed: Dec. 3, 2009

Related U.S. Application Data

(60) Provisional application No. 61/119,705, filed on Dec. 3, 2008.

(51) Int. Cl.
*G09G 5/00* (2006.01)
*A63F 13/00* (2014.01)
*A63F 11/00* (2006.01)

(52) U.S. Cl.
CPC .......... *A63F 13/00* (2013.01); *A63F 2011/0097* (2013.01); *G09G 2340/12* (2013.01)

(58) Field of Classification Search
None
See application file for complete search history.

(56) References Cited

U.S. PATENT DOCUMENTS

| | | | |
|---|---|---|---|
| 5,729,471 A * | 3/1998 | Jain et al. | 725/131 |
| 2005/0204385 A1 * | 9/2005 | Sull et al. | 725/45 |
| 2007/0199031 A1 * | 8/2007 | Nemirofsky et al. | 725/88 |
| 2009/0124387 A1 * | 5/2009 | Perlman et al. | 463/42 |
| 2009/0271821 A1 * | 10/2009 | Zalewski | 725/37 |

* cited by examiner

*Primary Examiner* — Yingchun He
(74) *Attorney, Agent, or Firm* — Sheppard, Mullin, Richter & Hampton LLP

(57) ABSTRACT

A computerized method operable on a computer system for compositing data streams to generate a playable composite stream includes receiving a plurality of independent data streams that are included in a broadcast stream. The independent data streams include a video stream and a metadata stream. The metadata stream includes a plurality of user selectable graphics metadata for a plurality of graphics options. The computerized method further includes receiving a user selection for at least one of the graphics options; and compositing the at least one graphics options with the video stream to generate a composite video stream, which includes the at least one graphics option and the video stream.

27 Claims, 21 Drawing Sheets

VIRTUAL PLAYBOOK WITH USER CONTROLS

CROSS REFERENCE TO RELATED APPLICATIONS

This application claims the benefit of U.S. Provisional Patent Application No. 61/119,705, filed Dec. 3, 2008, titled "Virtual Playbook with User Controls", of Jason Parker et al., which is incorporated by reference herein in its entirety for all purposes.

FIELD OF THE INVENTION

Embodiments of the present invention relate generally to interactive entertainment, such as video games, and in particular to systems and methods for providing interactive entertainment based replays.

BACKGROUND OF THE INVENTION

Interactive entertainment such as video games often depict game characters in a virtual world, where the game characters are performing some generally pre-defined tasks, typically under the direction of the person who is playing the game. In the context of a sports game, such as Madden™, published by Electronic Arts Inc., the person playing the game directs a football team and competes by running various football plays against his opponent. The opponent can be another person or the artificial intelligence of the game.

In sports broadcasting, it is desirable to comment on replays of selected events in a game, for example, a specific running play or the execution of a touchdown in football. Typically, this is accomplished by broadcasting a previously recorded video of the play and adding audio from a commentator who describes what is happening in the replay, which the viewer sees on his display.

As part of the commentary, additional indicators such as arrows may be added to the video to show particular directions of players and play movements that are involved in the replay. Such indicators may also be used to show hypothetical situations, for example, if a different result would have occurred had a particular player moved along a different, hypothetical route. If the hypothetical scenario is sufficiently complicated and involves many players, however, then such indicators may simply confuse the viewer further.

For complicated hypothetical scenarios, a sports broadcaster might be able to show the scenario using archived video footage of players executing the particular scenario, but since the number of different game play combinations is very high, it is inconvenient to search for and retrieve such material. Another option would be to get teams of players together for the purpose of executing the hypothetical scenario on a real field and to record the action, however, this is also inconvenient and generally not available in real time.

Video games provide the ability to create multiple scenarios very easily because the game may be played over and over again, each time with a new scenario in mind. The content of a particular scenario generally depends in part on how the user plays the game and in part how the artificial intelligence of the game reacts to the user's game play. These in-game scenarios can be recorded by the game camera. However, there are challenges with using the game camera for this purpose. Generally, the game cameras are designed to provide the game player with a field of view that is appropriate for the game genre (sports, adventure, shooter, racing, etc.) and the presentation style (first person, third person detached, cinematic, etc.). This field of view may not be the same view that is desired for viewing the hypothetical scenarios described above. For example, the game camera in a sports game may follow a particular character (the character that is being played by the user), and only show that portion of the field, basketball court, etc. to the exclusion of events, which may be happening outside of that field of view. Game cameras can be difficult and time-consuming to design because the designer needs to take into account the design of the game world and how the player character moves within that world in order to prevent undesirable effects that will cause a user to become distracted or disoriented. Designers are reluctant to make changes to software code associated with game cameras because breaking this code can be disastrous for a game and the game team's production schedule.

Thus, it would be desirable to provide a means for editing cameras in real time and to provide real time playback to combine three dimensional video game graphics with broadcast images to produce interactive "replays" of game scenarios.

BRIEF SUMMARY OF THE INVENTION

In accordance with an embodiment of the invention, systems and methods for providing interactive entertainment replays are provided. Systems and methods for using data-driven real time camera editing and playback to combine three dimensional video game graphics and broadcast images are also provided.

According to one embodiment of the present invention, a computerized method operable on a computer system is provided for compositing data streams to generate a playable composite stream. The method includes receiving a plurality of independent data streams that are included in a broadcast stream. The independent data streams include a video stream and a metadata stream. The metadata stream includes a plurality of user selectable graphics metadata for a plurality of graphics options. The computerized method further includes receiving a user selection for at least one of the graphics options; and compositing the at least one graphics options with the video stream to generate a composite video stream, which includes the at least one graphics option and the video stream.

According to a specific embodiment of the method, the plurality of graphics options include a plurality of graphics. The plurality of graphics may include text, telestrations, and ads. The method may further include displaying the composite video stream.

According to another specific embodiment of the method, the plurality of data streams furthering includes an audio stream and the metadata stream includes a plurality of user selectable audio metadata for a plurality of audio segments. The method may further include receiving a user selection for at least one audio segment identified by the user selectable audio metadata, and compositing the at least one audio segment with the audio stream and the composite video stream to generate a composite event stream.

According to another specific embodiment of the method, the first mentioned compositing step includes combining and synchronizing the at least one graphic and the video stream, and the second mentioned compositing step includes combining and synchronizing the at least one audio segment with the audio stream and the composited video stream. The metadata stream includes information for a three dimensional model of a player in a game, and the user selection for the at least one graphics options includes a field of view of the player, which is different from a field of view of the video stream. The method may further includes simulating a video stream for the player for the field of view; and displaying the simulated video stream. The video stream is of a recorded event or a live event. The live event may be a live sports event or a live game event.

According to one embodiment of the present invention, a computer program product on a computer readable medium is provided for compositing data streams to generate a playable composite stream. Another embodiment of the present invention includes a computer readable medium that includes code for executing a method for compositing data streams to generate a playable composite stream.

According to one embodiment of the present invention, a computer system for compositing three dimensional video game graphics onto broadcast studio images includes video camera for recording a view of a studio, and a network interface coupled to the studio video camera for translating the studio video camera inputs into real-time camera commands. The computer system further includes a network interface for receiving metadata. A game device is coupled to the network interface for receiving the real-time camera commands as input. The game device includes a game camera module for producing a game video output in accordance with the real-time camera commands, and a green screen module for extracting the game video output associated with game play from the game environment. The computer system further includes a compositing device for combining the extracted game video output with the studio video camera input.

According to one embodiment of the present invention, a computerized method for editing a game camera in real time includes parsing a plurality of real-time camera commands, receiving metadata, and determining a plurality of edit parameters. The computerized method further includes creating a game camera in accordance with the parsed real-time camera commands and the plurality of edit parameters.

One benefit of the various embodiments of the present invention includes providing users with a user definable video experience of a game where the user is permitted to select one or more a number user selectable option for changing the video and or audio output of a game while viewing the game. Giving the user more control over their game viewing experience provides an engaging gaming experience. These and other benefits of the embodiments of the present invention will be apparent from review of the following specification and attached figures.

The following detailed description together with the accompanying drawings will provide a better understanding of the nature and advantages of the present invention.

DETAILED DESCRIPTION OF THE INVENTION

Systems and methods for providing video game based replays is described herein. The systems and methods described herein may also be used for other forms of interactive entertainment and digital content, as will be described in further detail below.

Figure 1:
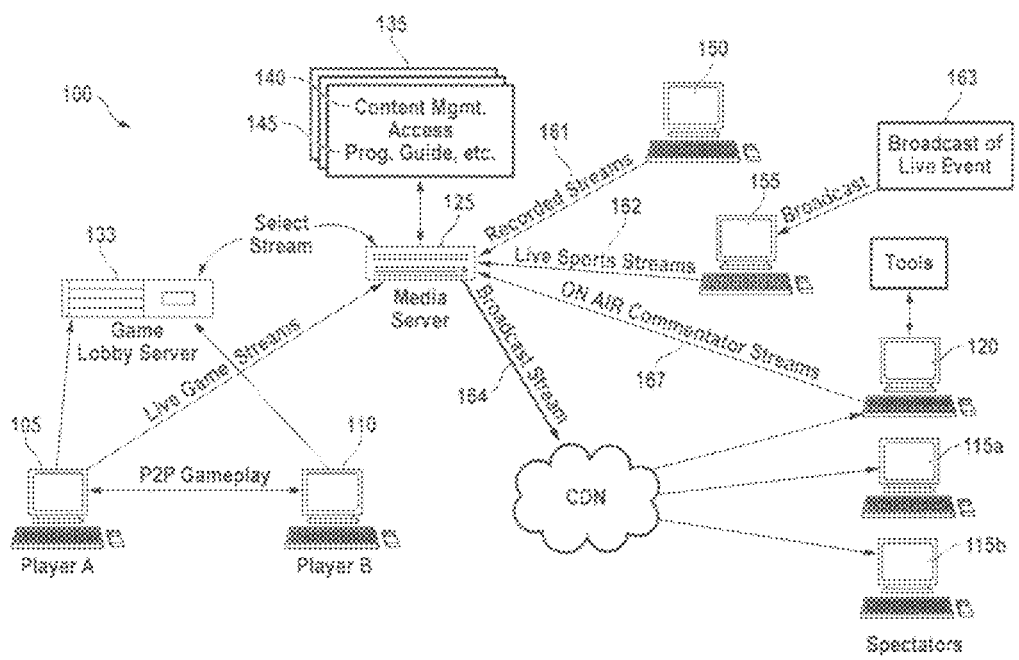
FIG. 1 is a simplified schematic of a spectator mode system according to one embodiment of the present invention.

FIG. 1 is a simplified schematic of a spectator mode system 100 according to one embodiment of the present invention. Various alternative embodiments of the spectator mode system may not include all of the components and systems shown in FIG. 1. These alternative embodiments are described below. According to the embodiment shown in FIG. 1, spectator mode system 100 includes first and second player computers 105 and 110, and a set of spectator computers 115 (e.g., first and second spectator computers 115a and 115b). A set as referred to herein includes one or more elements. Spectator mode system 100 further includes a commentator computer 120, a media server 125, and a game lobby server 130. Media server 125 may have access to a content management server 135, which is configured to provide to the media server content management information 140, a program guide 145 for content, and the like. The media server may be configured to in-turn provide the content management information and the program guide to the spectator computers and/or the commentator computer. Spectator mode system 100 may also include a recorded streams server 150, and a live streams server 155. According to one embodiment, the spectator mode server does not include recorded streams server 150, live streams server 155, and the system used with these serves. According to another embodiment, the spectator mode system does not include first and second player computers 105 and 110, and game lobby server 130. According to another embodiment, the spectator mode system does not include first and second player computers 105 and 110, game lobby server 130, and recorded streams server 150. According to another embodiment, the spectator mode system does not include first and second player computers 105 and 110, game lobby server 130, and live streams server.

The first and second player computers 105 and 110 may be configured to play a game in a peer-to-peer configuration. Both the first and second player computers may include a memory device (not shown) for storing game code and a processor for executing the game code. The executed game code provides for play of the game between the first and second computers.

According to one embodiment, the first and second player computers may locate one another via game lobby server 130. That is, a player A, using the first player computer, and player B, using the second player computer, may access (e.g., log into) the game lobby server to locate other players interested in playing a game. Player A and player B operating their respective player computers may be facilitated by the game lobby server to locate one another for game play in a peer-to-peer configuration.

One or both of the player computers may be configured to generate a live game stream 160 for the game as the game is being played on the first and second player computers. A live game stream is one example of an event stream. Other examples of events streams include a recorded stream 161 (stream for a recorded event) and a live sports stream 162 (stream from a live sporting event broadcast by a broadcaster 163). Recorded streams and live sports streams are described in further detail below. Live game stream 160 may include one or more types of data. For example, the live game stream may include a video stream, an audio stream, and/or a metadata stream. The video stream may include information for the video for the game being played. For example, the video stream may include video encoded in a variety of formats, such as one or more of the MPEG formats. The video stream may be for the field of view of the game shown on the monitors of the first and second game computers. The audio stream may include information for the audio of the game being played. The audio may also be encoded in a variety of formats, such as one of the MPEG formats. The metadata stream may include a variety of information for the game being played. The metadata might include information that may be used by the game code operating on another computer system (e.g., one of the spectator computers) to recreate the game (or to recreate portions of the game) on the other computer system. The video stream, the audio stream, and the metadata stream may be independent streams transmitted in the live game stream.

Live game stream 160 may be transmitted from one or both of the player computers to media server 125. The media server may broadcast the live game stream in a broadcast steam 164 over a network to one or more computers, which have permission to receive the broadcast stream. For example, the spectator computers may be configured to receive the broadcast stream if these computers appropriately access (e.g., login into) the media server and select the game for viewing. The media server may be configured to allow users of the spectator computers to select from a variety of broadcast streams for a variety of games being played.

Each spectator computer may receive the broadcast stream from the media server so that a game being played between the first and second player computers may be displayed on the spectator computers. More specifically, the spectator computer may include the same, or substantially the same, game code that is being executed on the first and second player computers. The spectator computer may be configured to supply the broadcast stream (i.e., the video stream, the audio stream, and/or the metadata stream) to the game code executed on the spectator computer. The game code may be configured to use the video stream, the audio stream, and/or the metadata stream to reconstruct the game that is being played on the first and second computers. The spectator computer may then direct the output of the game code to the spectator computer's monitor and/or speaker system. Thereby, a user using the spectator computer may view and hear the game being played on the first and second computers. Use of the broadcast stream by the spectator computers and the game code is described in further detail below.

According to a further embodiment, commentator computer 120 may also be configured to receive the broadcast stream if, for example, the commentator computer is logged into the media server. The commentator computer may include the same, or substantially the same, game code that is being executed on the first and second player computers. The game code may be configured to use the video stream, the audio stream, and/or the metadata stream to reconstruct the game that is being played on the first and second computers.

The commentator computer may then direct the output of the game code to the commentator computer's monitor and/or speaker system. Thereby, a user (e.g., a commentator) using the commentator computer may view and hear the game being played on the first and second computers.

According to one embodiment, the commentator computer is configured to provide a plurality of viewing options for viewing and/or commenting on the game being played. The commentator computer may be configured to store and execute "director" code, which provides a user interface by which a commentator my select one or more of the viewing options. The director code may be a code module of the game code. The director code is described in further detail below.

A commentator operating the commentator computer may interact with the director code executed on the commentator computer to comment on the game being played. FIGS. FIGS. 2-6 are examples of user interfaces that the executed director code may be configured to provide for display on the monitor of the commentator computer. The user interfaces provide a number of screen selectable options that a commentator may be permitted to select from for commenting on the game.

Figure 2:
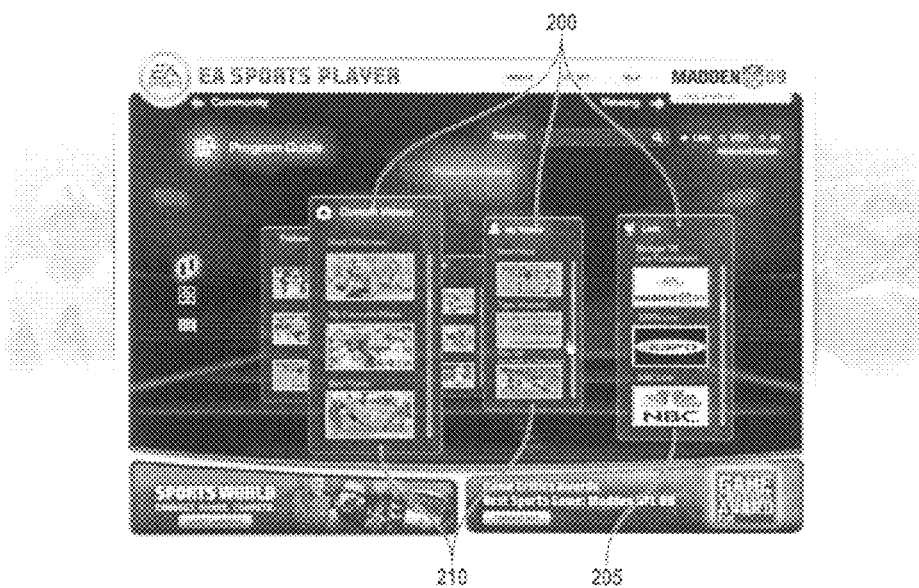
FIG. 2 is a schematic of a stream-selection user interface that may be displayed on the commentator computers and may include a set of viewing options.

Specifically, FIG. 2 is a schematic of a stream-selection user interface that may be displayed on the commentator computers and may include a set of viewing options 200. The set of viewing options 200 may include viewing options for selecting a specific broadcast stream that the commentator may provide comments for. The broadcast stream options may include a live-stream option 205 for selecting "live" events. The live events from which a commentator may make a selection may include the game that is being played in the peer-to-peer connection between the first and second game computers, a live sporting event (such as a football game, a tennis match, a soccer game, a basketball game or the like), or other live event. The term "live," as used herein, refers to an event that is occurring as the broadcast stream for the event is being broadcast and consumed by a computer, such as a spectator computer or a commentator computer. It will be understood by those of skill in the art that there may be a delay (e.g., 1 second, 5 seconds, 15 second, etc.) between actual activity occurring in an event and the broadcast for the live event. Broadcast streams for live sporting events are discussed in further detail below. The user interface shown in FIG. 2 also includes viewing options 210 for selecting a recorded stream.

Figure 3:
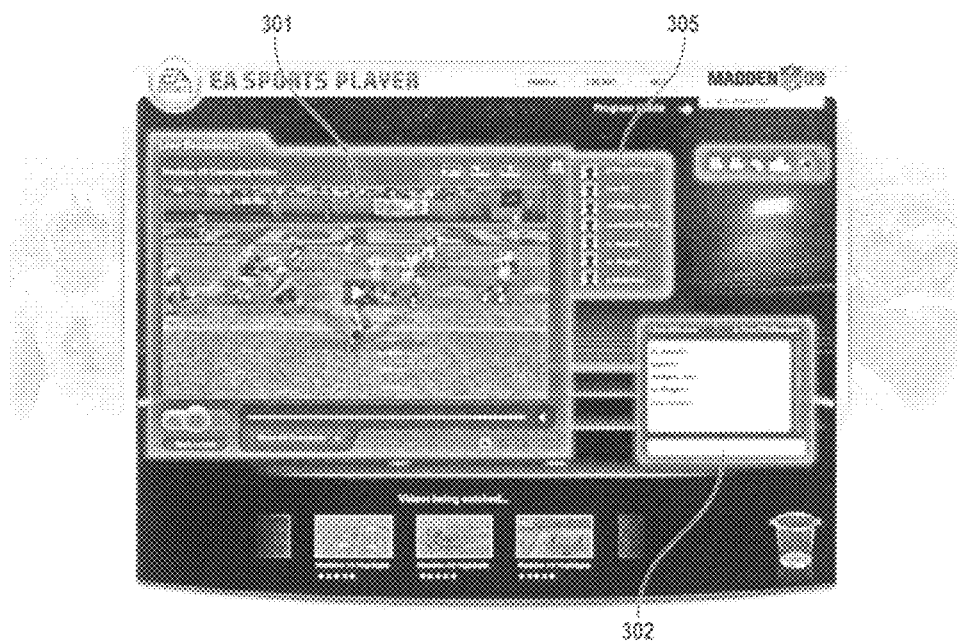
FIG. 3 is schematic of a messaging user interface that may be displayed on the commentator computer.

FIG. 3 is schematic of a messaging user interface that may be displayed on the commentator computer. The messaging user interface may include a video display 301 of an event (e.g., the game being played peer-to-peer on the first and second player computers) selected for viewing via the stream-selection user interface shown in FIG. 2. The messaging user interface may also include a "chat" box 302 for chatting with other users who may be watching the event on the user's respective computers (e.g., other commentator computers, other spectator computers or the like). The chat box may be configured for typing "in" for chat message that may be delivered to other user computers (e.g., other commentator computers, other spectator computers, or the like), and for displaying chat messages received from other user computers. Each user computer (e.g., other commentator computers, other spectator computers, or the like) may include a copy of the director code for displaying the user interfaces shown in FIGS. 2-6, and for providing the user selectable options provided via the user interfaces (e.g., chat). The messaging user interface may include a viewer list 305, which displays identifiers for users who are streaming the game to their computers. Users identified in the viewers list may include friends of the commentator, user's that have selected the particular commentator for viewing the commentators commentary, or the like.

The director code operating on the commentator computer may be configured to generate metadata for the commentator's chat message. The commentator computer may be configured to transmit the metadata for the commentator's chat message from the commentator computer in an on-air commentator stream 167 to the media server. The media server may be configured to combine and synchronize (referred to herein as compositing) the commentator's chat message with the live game stream (or alternatively the live sports stream or the recorded stream if one these streams is selected) into the broadcast stream, which may be transmitted to the spectator computers. The spectator computers, also displaying a messaging user interface, may be configured to display the commentator's chat message. The metadata for the commentator's chat message may include time information for the temporal position in the game at which the chat message was generated. The media server may use the time information to composite the commentator's chat message with the live game stream, such that the chat message appears on the spectator computers at the same temporal position in the game at which the commentator entered the chat message. According to an alternative embodiment, each spectator computer and commentator computer may be configured to composite the metadata and the chat message with the live game stream. Each instance herein where the media server is described as being configured composite various data steams, the announcer computer and/or the spectator computers may be configured to the describe compositing. As described briefly above, the broadcast stream might be temporally delayed from the actual events occurring in the game to provide processing time for the media server to composite the chat message with the live game stream, and so that the chat message may be temporally displayed to the correct temporal position in the game on the spectator computers. According to some embodiments, each spectator computer executing the director code may be a commentator computer.

Figure 4:
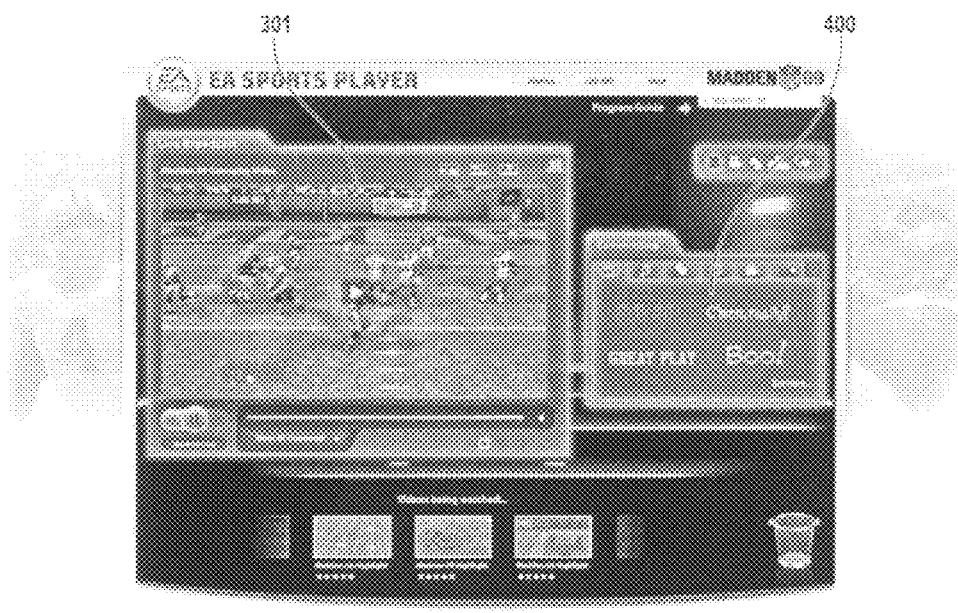
FIG. 4 is a simplified schematic of a text-grab user interface.

FIG. 4 is a simplified schematic of a text-grab user interface, which may be displayed on the commentator computer and includes a set of phrases 400 where each phrase may be dragged and dropped (or otherwise selected) onto the video display for the event displayed in video display 301. The executed director code may be configured to generate metadata for a selected phrase that is dragged and dropped onto the video display. The metadata may be sent out from the commentator computer in the on-air commentator stream to the media server. The media server may be configured to composite the metadata for the selected phrase with the live game stream into the broadcast stream, and transmit the broadcast stream to the spectator computers. As described above, the metadata for the selected phrase may include time information so that the selected phrase may be displayed on the spectator computers at the same temporal position in the game at which the commentator dragged and dropped the selected phrase onto the video display of the game. Each phrase selected for display may be played on the spectator computers for a period of time. The period of time may be a predetermined period of time (e.g., two or three seconds) or a period of time selected by the commentator. The metadata may include information for the period of time.

Figure 5:
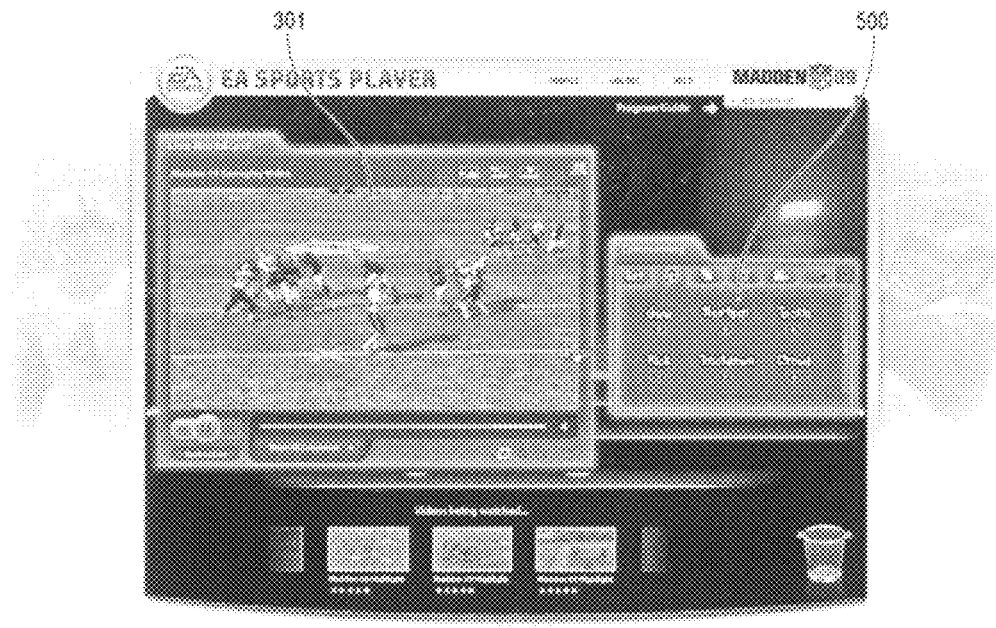
FIG. 5 is a simplified schematic of an audio-grab user interface that may be displayed on the commentator computer and includes a set of audio selections.

FIG. 5 is a simplified schematic of an audio-grab user interface that may be displayed on the commentator computer and includes a set of audio selections 500. Each audio selection may be associated with a piece of audio that may be played on the spectator computers. Specifically, each audio selection may be dragged and dropped (or otherwise selected) onto the video display for the event displayed in video display 301. The executed director code may be configured to generate metadata for a selected piece of audio that is dragged and dropped onto the video display. The metadata may include encoded audio encoded in a variety of formats. Alternatively, the metadata may include information to identify the piece of audio that might form a portion of the game code, which is resident on each spectator computer. The metadata may be sent out from the commentator computer in the on-air commentator stream to the media server. The media server may be configured to composite the metadata for the selected piece of audio with the live game stream into the broadcast stream, and transmit the broadcast stream to the spectator computers. As described above, the metadata for the selected piece of audio may include time information so that the selected piece of audio may be played on the spectator computers at the same temporal position in the game at which the commentator dragged and dropped the selected piece of audio onto the video display of the game. According to a further embodiment, an interface may be provided via which a commentator may verbally comment on a game. This commentary may be digitized and transmitted in the on-air commentator stream for inclusion in the broadcast stream transmitted to the spectator computers, and played thereon with the game.

Figure 6:
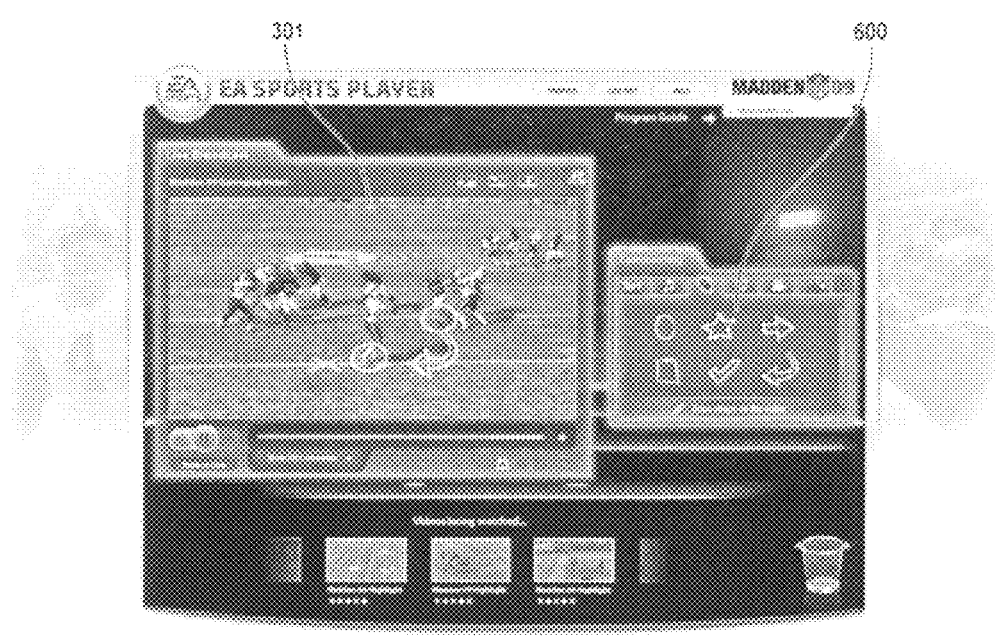
FIG. 6 is a simplified schematic of a graphics-grab user interface that may be displayed on the commentator computer and includes a set of graphics.

FIG. 6 is a simplified schematic of a graphics-grab user interface that may be displayed on the commentator computer and includes a set of graphics 600. Each graphics selection from the set of graphics 600 may be played on the spectator computers in conjunction with the video for the game displayed on the spectator computers. Specifically, one or more graphics selections may be dragged and dropped (or otherwise selected) onto the video display for the event displayed in video display 301. The executed director code may be configured to generate metadata for a selected graphic that is dragged and dropped onto the video display. The metadata may be sent out from the commentator computer in the on-air commentator stream to the media server. The media server may be configured to composite the metadata for the selected graphic with the live game stream into the broadcast stream, and transmit the broadcast stream to the spectator computers. As described above, the metadata for the selected graphic may include time information so that the selected graphic may be played on the spectator computers at the same temporal position in the game at which the commentator dragged and dropped the selected graphic onto the video display of the game. Each selected graphic may be played on the spectator computers for a period of time. The period of time may be a predetermined period of time (e.g., two or three seconds) or a period of time selected by the commentator. The metadata may include information for the period of time. According to one embodiment, the graphics-grab user interface is configured to permit a commentator to select multiple graphics (e.g., the three graphics shown in the example of FIG. 6) for display on a game on the spectator computers.

As discussed briefly above, the media server may be configured to receive recorded streams 161 from the recorded streams server 150 and receive live sports streams 162 from the live sports server 155. Similar to live game streams, both recorded streams and live sports streams may include a video stream, an audio stream, and/or a metadata stream. Also similar to the live game stream, one or more of a video stream, an audio stream, and a metadata stream included in recorded streams and live sports steams may be transmitted in the broadcast stream to the spectator computers and/or the commentator computer. Game code and/or other computer code operable on a spectator computer or a commentator computer may be configured to use the video stream, the audio stream, and/or the audio stream for recorded streams or live sports streams for playing the recorded streams or the live sports streams on the spectator computer or commentator computer.

According to one embodiment of the present invention, a recorded stream might be a stream that is recorded from a live event or a simulated event. A simulated event (e.g., a simulated game event) might be a live event. For example, the game played on the first and second player computers may be a live event, and the game code for the game may generate simulated video for one or more players in the game, a background in the game, game pieces (e.g., a football, a basketball, a sword, a car, etc.) in the game or the like. Each of the user interfaces shown in FIGS. 2-6 may be used in conjunction with a recorded stream or a live sports stream.

Figure 7:
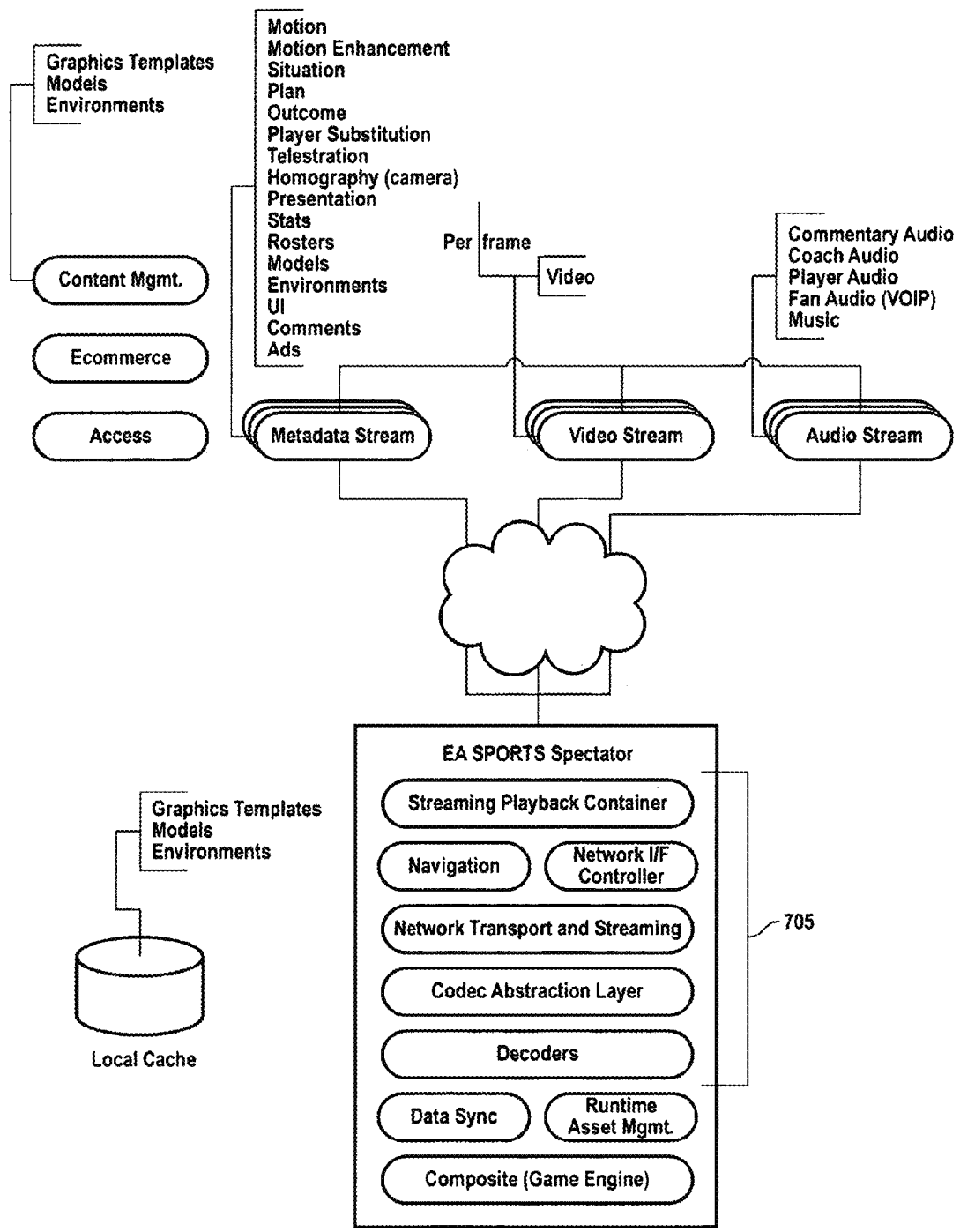
FIG. 7 is a further detailed view of the data streams that may be included in an event stream and/or a broadcast stream.

FIG. 7 is a further detailed view of the data streams (video stream, audio stream, and metadata stream) that may be included in an event stream (e.g., a live game stream, a recorded stream, and/or a live sports stream) and/or a broadcast stream. FIG. 7 also shows a further detailed view of a spectator computer according to one embodiment of the present invention. FIG. 7 also shows various content that might be provided by content manager system 135 to the spectator computers and/or the commentator computer.

As shown in FIG. 7, a video stream might include time coded and packetized video information for an event. An audio stream might include encoded audio information for commentary, coach audio (e.g., is a coach is being audio monitored), player audio (e.g., if a player is being audio monitored), fan audio, music, etc.

Various types of metadata that might be included in a data stream include: motion metadata, motion enhancement metadata, situation metadata, plan metadata, outcome metadata, player situation metadata, homography metadata, presentation metadata, statistics metadata, rosters metadata, models metadata, environments metadata, user interface metadata, comments metadata, ads metadata, etc.

More specifically, motion metadata may include position information (e.g., (x, y, and/or z) coordinate data) for the player's in a game, and may include direction information for the direction each player is moving in a game. For example, the position information may specify a player's position on a football field, and the direction information may specify the direction each football player is moving in a given play. Motion enhancement metadata may include information for the acceleration and deceleration of players in a game, information for where players may be looking, information for where a player places her feet, information and/or models for articulated skeleton motion, etc. Situation metadata may include information for a specific time remaining in a game, information for a down number in football game, information for the number of yards from a first down, information for the specific down number in a football game, information for the time left on the clock for a quarter in a game, information for the quarter number, or the like. Plan metadata may include information for a particular play that was called. For example, the plan information may indicate that a quarter back sneak was planned in a football game, a hail mary pass was planned in a football game, etc. Outcome metadata may include information for the outcome of a given situation in a game, such as the outcome of a particular down played in a football game. For example, the outcome information may indicate that a pass was completed, a pass was intercepted, a field goal kick was successful, a turnover of a football occurred, etc. Player substitution metadata may include information for a player removed from a game and another player put in place of the removed player.

Player telestration metadata may include information for placing a graphic on a video and displaying the video on a spectator computer or a commentator computer. Example telestrations include the graphics shown in video display 301 in FIG. 6. Telestration metadata might also include information that identifies a player (e.g., a football player) or an object (e.g., football, a soccer ball, a hockey puck, etc.) whose movement is to be tracked as play occurs in a game. For example, as play in a game occurs, a telestration for a tracking path of the movement of the player or object may be displayed on the monitor of the spectator computers and/or the commentator computer. Homographic metadata may include information for a camera that is shooting a game. For example, the homographic metadata may include information for the field of view of the camera, the camera angle, the camera position, etc.

Presentation metadata may include information for how a game is to be presented. Statistic metadata may include statistics for a game such as scores, individual player statistics, etc. Roster metadata may include information for the group of players who are eligible to play a game, players that play a game, substitute players for a game, etc. The roster metadata may include player numbers, player positions (e.g., quarter back, tight end, etc.), and the like. Models metadata may include three dimensional (3D) models for players (bodies, limbs, heads, feet, etc.), stadiums, ads, characters, etc.

Environment metadata may include information for a stadium in which a game is played. Environmental metadata might also include weather information, geographic coordinates of where a game is being played so that weather information may be retrieved for the location. Environmental metadata might also include information for automobile traffic near a location where a game is played. User interface metadata may include information the user interface against with a game is presented. Comment metadata may include information for comments for a commentator or the like. Ads metadata may include information for an ad that is to be displayed, and may include position information for the location at which an ad is to be placed (e.g., on a football field).

Figure 8:
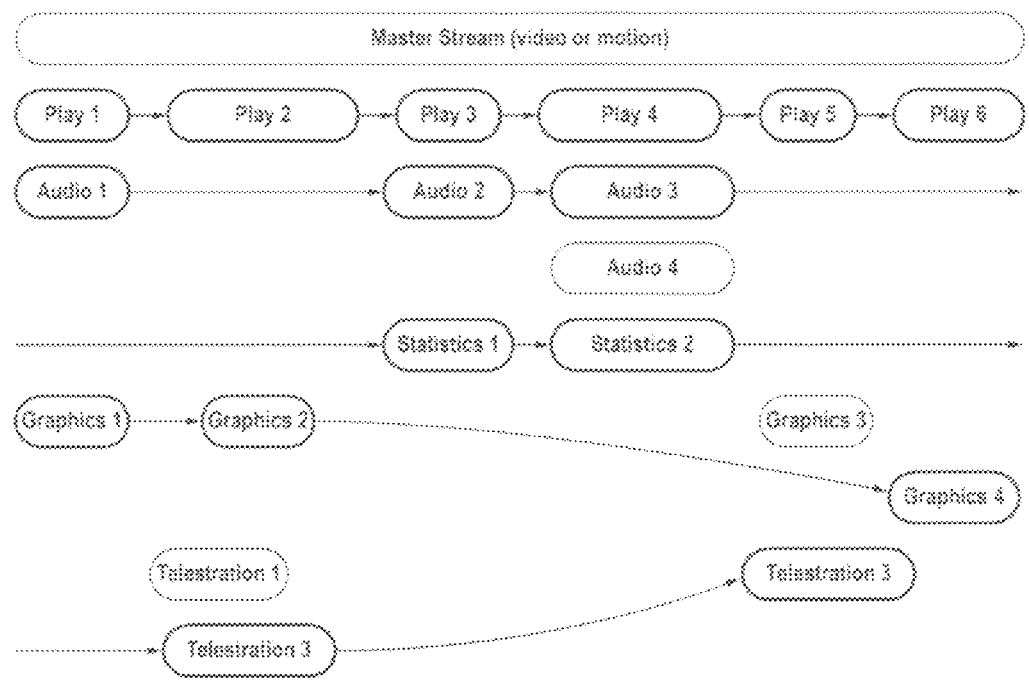
FIG. 8 is a schematic of various video segments in a video stream, various audio segments in an audio stream, and various metadata in a metadata stream that may be composited.

As shown in FIG. 7, a spectator computer may include a media player 705, which includes a streaming playback coordinator, a navigation tool, a network I/F controller, a network transport and streaming module, a codec abstraction layer, and one or more decoders. The director code may include a data synchronization engine for synchronizing data streams received in a broadcast stream. The data synchronization engine may be configured to synchronize the video and audio streams with the metadata (e.g., chat messages, user selected graphics, user selected phrases, user selected audio clips, or commentator commentary). The director code may also include a run time assert manager, and a composite engine. The composite engine is configured to composite the video stream, the audio stream, and/or one or more pieces of the metadata. According to one embodiment, the executed director code is configured to provide a user interface via which a user may select the specific pieces of metadata that the user wants to have composited with the video stream and/or the audio stream. For example, the executed director code may be configured to provide an option where a user may select that a video stream is to be composited with metadata for a telestration of a player executing a play. The game code may be configured to use the composited video stream and metadata to display the video in the video stream with a telestration of the player. FIG. 8 is a schematic of various video segments in a video stream, various audio segments in an audio stream, and various metadata in a metadata stream that may be composited. Various specific example of composited video streams, audio streams, and user selected metadata streams are discussed in further detail below.

As shown in FIG. 7, the spectator computer might include, or be coupled to, a local cache, which is configured to store graphic templates, models, and environments. The graphics templates may include the graphics for the user interfaces discussed above with respect to FIGS. 2-6. The models may include two dimensional models for players, three dimensional models for players, and other models. The models for the players are relatively sophisticated and allow a player recorded from one angle in a game (e.g., a live sports game), to be viewed from other angles (i.e., rotated by the director code) so that a player moving in a game may be displayed on a computer monitor executing the recorded move from any angle, or more generally from any field of view. According to one embodiment, the director code operating on the spectator computers and/or the commentator computer provides a user interface via which a user may select a field of view (different from the angle at which a player was recorded). The executed game code may generate the selected field of view for display on the spectator computer's monitor.

As described briefly above, the director code may be configured to display one or more user interfaces via which a user (e.g., a commentator or a spectator user) may select various data streams received in a broadcast stream for compositing. The director code may be configured to receive a user selection for compositing and may generate a composited data stream for display based on the user selection. The director code may provide for the display of a user interface, such as the user interface show in FIG. 2, via which a variety of events streams (e.g., video streams) may be selected for compositing. The director interface may be configured to provide a variety of other similar user interfaces via which various audio streams and/or metadata may be chosen for compositing with a video stream.

Figure 9:
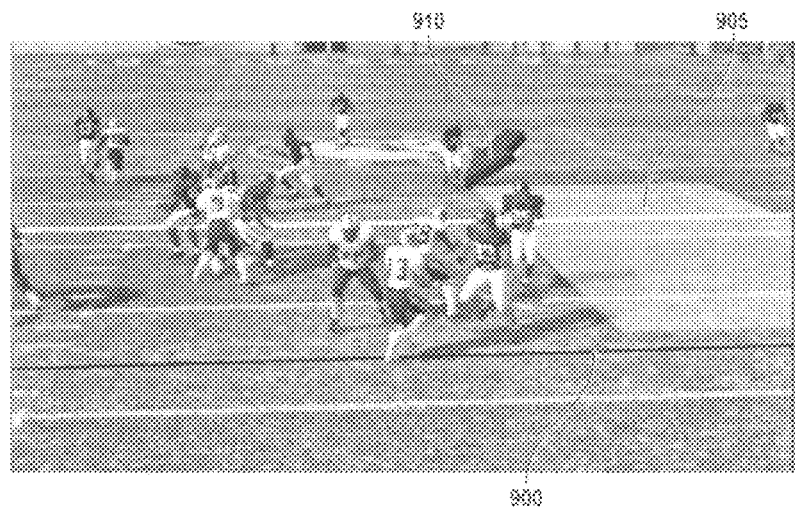
FIG. 9 is a simplified schematic of a screen captured image of a video that has been composited with various graphics, which may be available for selection and composition via the director code executed on a spectator computer or a commentator computer.

FIG. 9 is a simplified schematic of a screen captured image of a video that has been composited with various graphics, which may be available for selection and composition via the director code executed on a spectator computer or a commentator computer. The screen captured image may be a simulated image of a football game that might be generated from game code executed on the first or second player computers during peer-to-peer game play. Alternatively, the screen captured image may be a simulated image of a football game that might be generated from game code executed on a single computer, such as the first player computer during game play. According to another alternative embodiment, the screen captured image may be from a real football game, which may be live or recorded. According to another alternative embodiment, the screen captured image may be from a motion capture of a real football game, which may be live or recorded. According to one embodiment, various computers in spectator mode system 100 may be configured to perform motion capture on a video stream. For example, live sports server 155 may be configured to perform motion capture of a broadcast of a live sports event to generate live sports streams 162. Alternatively, recorded streams server 155 may be configured to perform motion capture on a recorded stream to generate recorded streams 161. Alternatively, media server 125 may be configured to perform motion capture on recorded sports streams 161 or live sports streams 162.

The screen captured image shown in FIG. 9 includes a plurality of graphics composited with the video stream from which the screen captured image is taken. For example, the screen captured image includes a dark horizontal line 900, which indicates the foot position on the playing field of the player (e.g., player 13) who is in possession of the football. In the composited video from which the screen captured image was taken, the horizontal line may be configured to follow the foot position of the player in possession of the football as the player moves. A highlighted rectangle 905 is also shown in the screen captured image. Note that the highlighted rectangle is transparent and is shown as being above the plane of the field but behind the players. A commentator, or the like, interacting with the user interface might select to the have highlighted rectangle composited with the video stream to draw attention to some action in the football game that is about to occur or that is occurring in that area of the field. Another graphic that is composited with the video stream and shown in the screen captured image includes arrow 910. Arrow 910 may be configured to point at a player and follow the player as the player moves in the game. For example, the arrow may be configured to point at the player in possession of the football and move to follow this player.

According to one embodiment, the metadata stream may include information and data for the plurality of graphics composited with the video stream. Each of the graphics displayed may be user selectable via selection of one or more pieces of metadata from the metadata stream. Subsequent to selection of a piece of metadata, the relevant portions of the metadata stream corresponding to the selected metadata may be composited with the video stream. Additional or alternative graphics, sound clips, or the like may, which may be composited with the video stream may also be user selectable via the user interface provided by the director code. Further, the field of view for a game may also be user selectable. The field of view may be selected based on portions of video stream capture and generated by various cameras capturing the game. The field of view may also be selected for a virtual camera (referred to herein as a game camera). The virtual camera operating in conjunction with the game code, the director code, 2D or 3D player models, and the like, may be configured to generate simulated video of a game for the user selected field of view. The simulated video may be composited with the graphics discussed above, audio clips, and the like.

Figure 10:
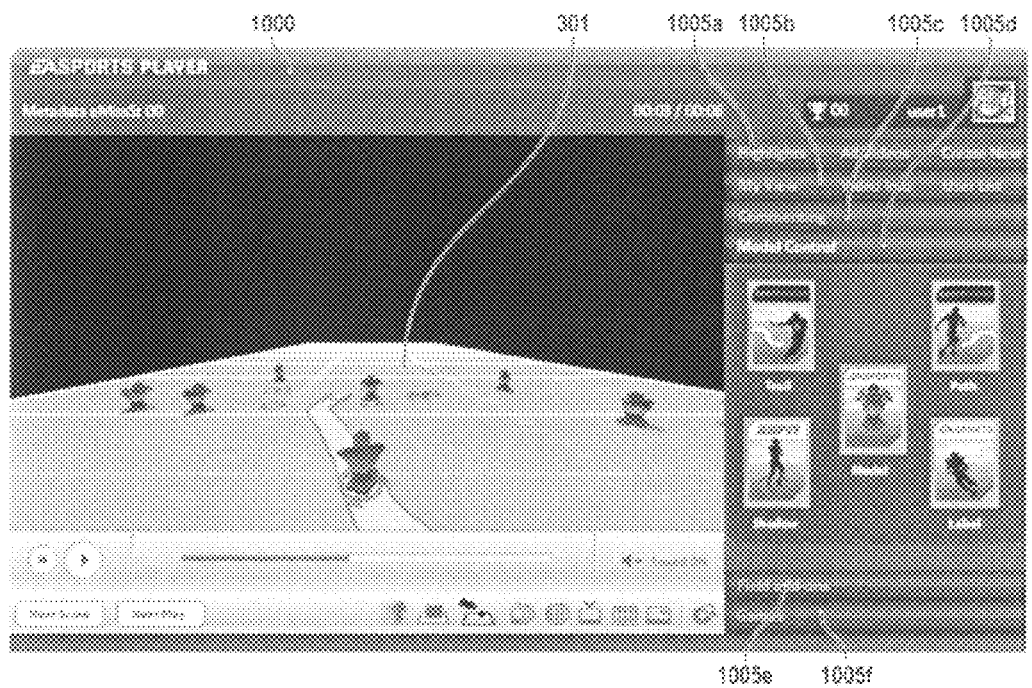
FIG. 10 is an example user interface having a video display, and a plurality of user selectable options.

FIG. 10 is an example user interface 1000 having a video display 301 thereon, and a plurality of user selectable options 1005. The user selectable options may be tabbed. The tabs are labeled with the reference numeral 1005 and alphabetic suffixes. In example user interface 1000 the model option tab is selected. According to one embodiment, the model option tab may include user selectable options for a trail, a path, a model, a shadow, and a label. The user selectable options are associated with the metadata stream and may represent the various metadata in the metadata stream. Video display 301 includes a screen captured image of a video stream of a game where the user selectable option for a model (e.g., a 3D model) of the players is selected. Models of the players may be simulated by the game code. According to one embodiment, the models of the players may be simulated based on a video stream of a live sports game, for example, where motion capture of the players in the live sports game has been performed. That is, the simulated players may follow the paths, and perform the actions of the "real" players in the live sports game. According to the specific embodiment of user interface 1000, the path option in the model option tab has been selected and a path has been composited with simulated video of one of the modeled players. A path shows not only positions that a players has been previously, but also shows the position that a player will be at in the future. A path differs from a trail option, it that a trail shows where a player has been previously, but does not show where a player will be in the future.

Figure 11:
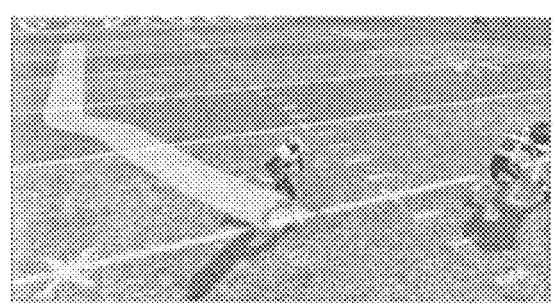
FIG. 11 is an example screen captured image of a composite video where a video stream of a game is composited with a trail for a player.
Figure 12:
FIG. 12 is an example screen captured image of a composite video where a video stream of a game is composited with an arrow that is configured to trail for a player.
Figure 13:
FIG. 13 is an example screen captured image of a composite video where a video stream of a game is composited with a strobe image of a player moving in a game.

FIG. 11 is an example screen captured image of a composite video where a video stream of a game is composited with a trail for a player. FIG. 12 is an example screen captured image of a composite video where a video stream of a game is composited with an arrow that is configured to trail for a player. FIG. 13 is an example screen captured image of a composite video where a video stream of a game is composited with a strobe image of a player moving in a game. As can be seen in screen captured images shown in FIGS. 9-13, embodiment of the present invention provide a variety of user selectable options where a user is permitted to choose how to view an event. More specifically, as embodiments of the present invention provide user selectable option for allowing a user to choose various metadata in a metadata stream to composite with a video stream and/or an audio stream, the user can control her experience in viewing an event, such as a live or recorded sporting event, a game played between two computers or the like.

Figure 14:
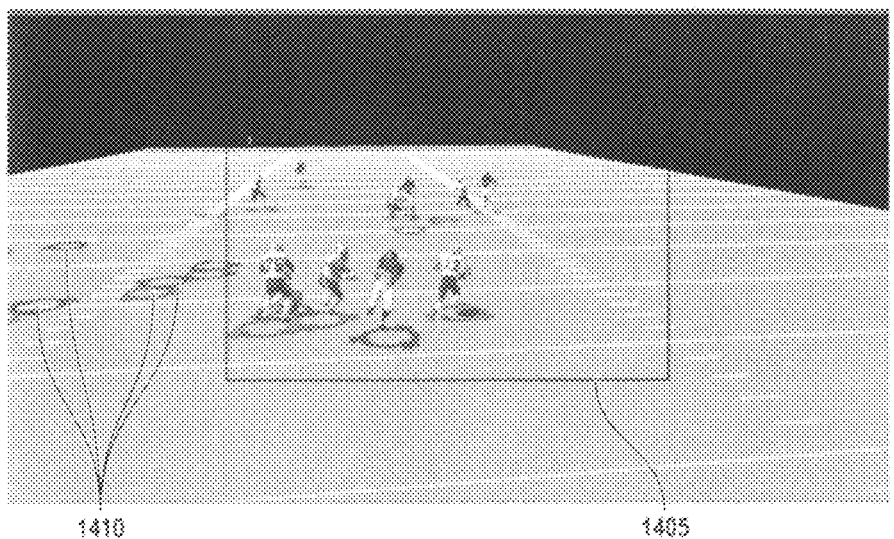
FIG. 14 is a screen captured image of another user selectable option that the director code or game code may provide.

FIG. 14 is a screen captured image of another user selectable option that the director code or game code may provide. The screen captured image includes a boarder 1405. Inside of border 1405, the screen captured image may be from a video stream for game for which the video stream is available from a live game stream, a live sports stream, or a recorded stream. Outside of border 1405, the screen captured image may be from a simulated video stream. That is, a video stream for the portion of the screen captured image outside of the border may not be available in a received live game stream, a live sports stream, or a recorded stream. However, the metadata stream provided with a live game stream, a live sports stream, or a recorded stream may include position information for players and the directions the players traveled during play. If the user chooses (via a user interface supplied by the director code or the game code) to view the extended field of view that is outside of border 1405, the game code may be configured to generate a simulated video stream of the player's positions and movements based on the received metadata stream. The executed game code may be configured to composite this simulated video stream with the video stream for the live game stream (or the like). The simulated video stream may include simple circular graphics 1410 for the players as shown in FIG. 14 or may include 2D or 3D simulations of the players (not shown).

Figure 15:
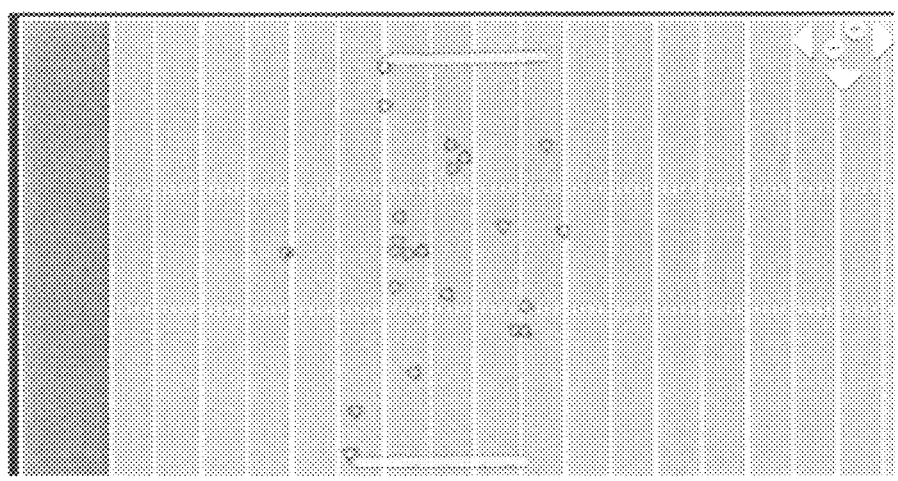
FIG. 15 is a screen captured image of a top down view of a video stream.
Figure 16:
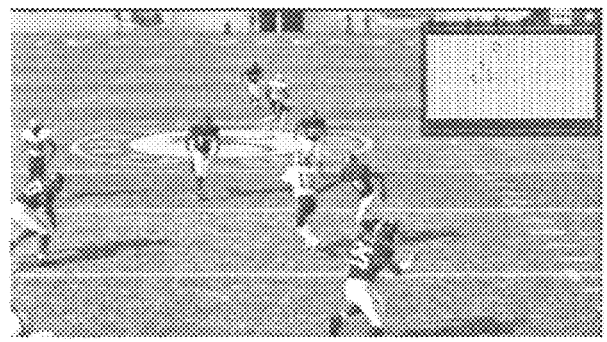
FIG. 16 is a screen captured image of the screen captured image shown in FIG. 15 in a picture-in-picture configuration with another video stream.

FIG. 15 is a screen captured image of a top down view of a video stream. The video stream from which screen captured image is taken may be a simulated video stream, which is simulated by the game code. The game code may generate the simulated video stream based on position metadata of players provided in the metadata stream and may also be based on a live game stream, a live sports stream, or a recorded stream. FIG. 16 is a screen captured image 1600 of the screen captured image shown in FIG. 15 in a picture-in-picture configuration with another video stream.

Figure 17:
FIG. 17 is an alternative view of the user interface shown in FIG. 10.

FIG. 17 is an alternative view of user interface 1000, which is shown in FIG. 10. In the view of user interface 1000 shown in FIG. 17, the commentating tab is selected. The commentating tabs provide a plurality of user selectable options for compositing an ad with a video stream. Video display 301 shows an ad (e.g., an EA Sports ad) composited with a video stream of a football game. A commentator who may be commentating on a game (e.g., an EA Sports game played between two player computers) may select a screen option in the commentator tab for placing the ad so that each spectator using her spectator computer may see the ad when viewing a video stream for the game.

Figure 18:
FIG. 18 is another alternative view of the user interface shown in FIG. 10.
Figure 19A:
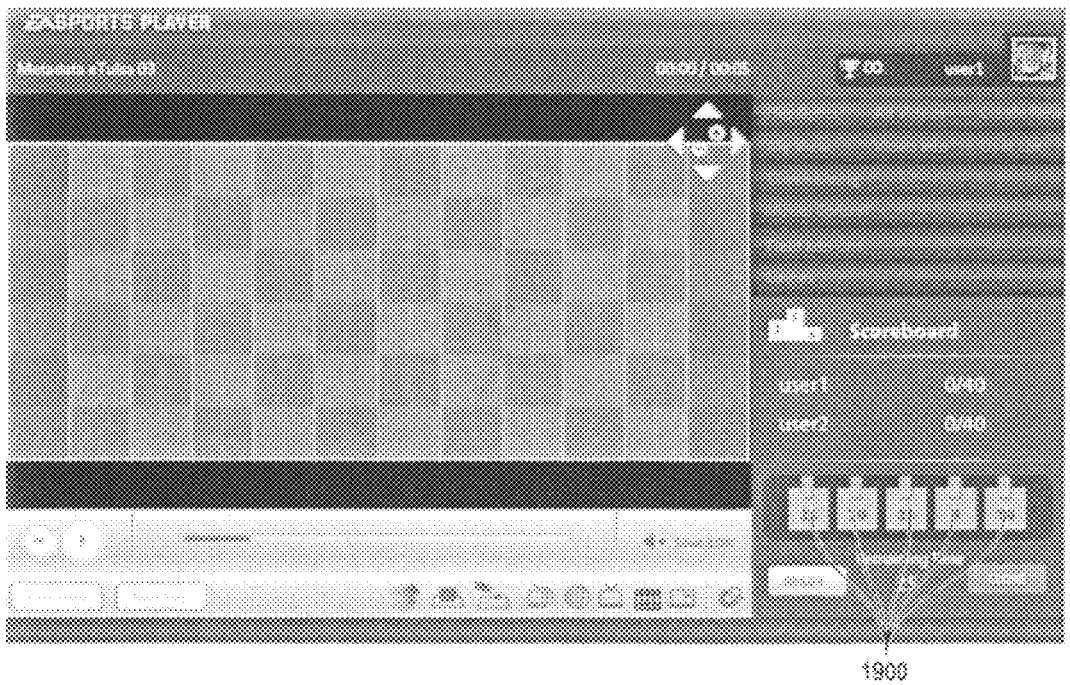
FIGS. 19a-19b, 20, and 21 are screen captured images of a "meta-game" that may be provided by the game code in conjunction with a game that is displayed on spectator computers or a commentator computer.
Figure 19B:
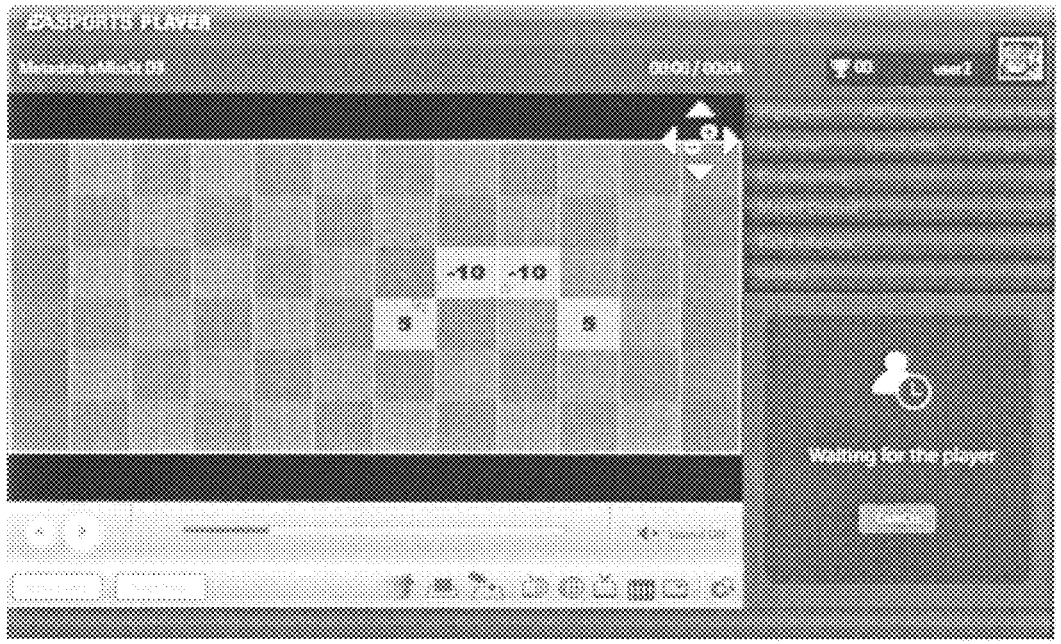
Figure 20:
Figure 21:

FIG. 18 is another alternative view of user interface 1000, which is shown in FIG. 10. In the view of user interface 1000 shown in FIG. 18, the model control tab is selected. As discussed above the model control tab provides a plurality of user selectable option from compositing a graphic with a video stream. In the particular example of FIG. 18, a label is selected for compositing with a video stream. The label is shown a above a player on the right hand side of video display 310. The label may be composited with the video stream for a predetermined period of time (2 second, 5 second, etc.). The label may follow the player. The game code may use position metadata for the player to generate a composited video stream where the label follows the player.

Figure 22:
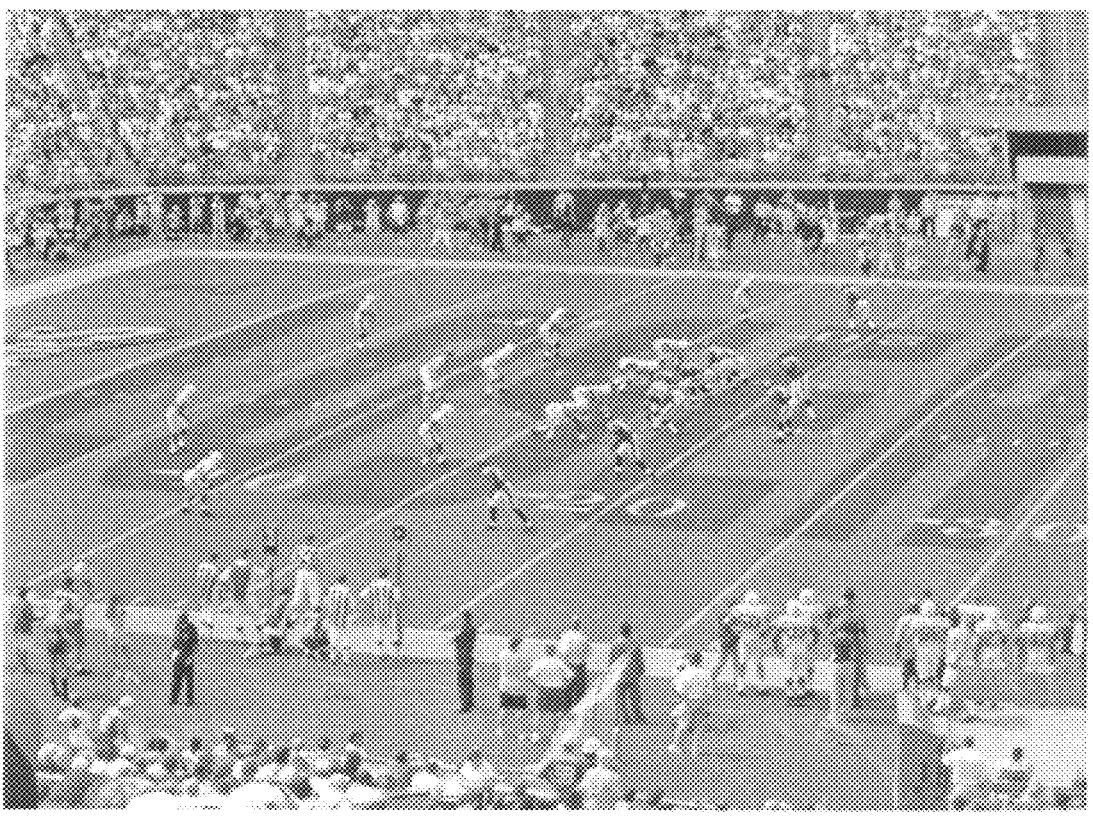
FIG. 22 is a screen captured image of video stream having a message composited with the video stream that may be played on the losing player's computer for the select period of time.

FIGS. 19a-19b, 20, and 21 are screen captured images of a "meta-game" that may be provided by the game code in conjunction with a game (e.g., a football game) that is displayed on spectator computers or a commentator computer. The specific meta-game shown in FIGS. 19a-19b, 20, and 21 divides a playing field (e.g., a football field) into a grid having a number of boxes. The meta-game is configured to receive a set of user selections for one or more boxes in the grid. Each selected box may be a portion of the playing field at which a user might guess that a game event is going to occur. A game event may be a completed pass in a football game, a tackle in a football game, or the like. The game code may provide a set of betting weights 1900 that a user might place on the boxes that the user has selected. If a game event enters the boxes selected by the user, the user might be awarded the points of the betting weights selected. One or more players using their player computers, for example, may play a meta-game against one another. For example, two players might play the meta-game shown in FIGS. 19a-19b, 20, and 21 to selected point total (e.g., 200 points). The game code may be configured to provide a reward to the player who wins the meta-game (first accumulates 200 points). For example, the winner of the meta-game may be provided with a user selectable option for placing a message in the losing player's video streams for a select period of time (e.g., a week). The message might be configured to remind the losing player of the loss. FIG. 22 is a screen captured image of video stream having a message (e.g., "loser") composited with the video stream that may be played on the losing player's computer for the select period of time.

Figure 23:
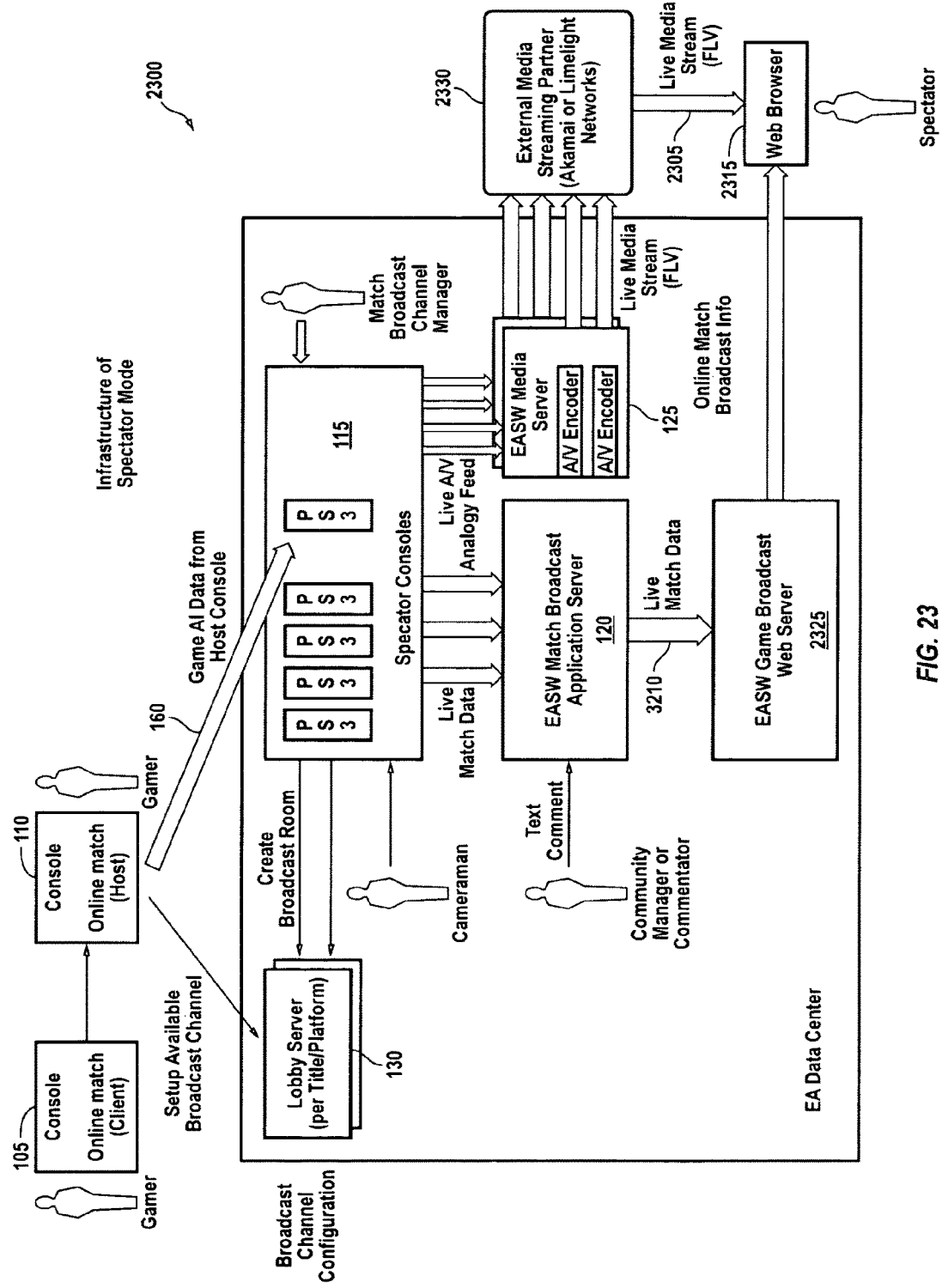
FIG. 23 is a simplified schematic of a spectator mode system 2300 according to another embodiment of the present invention.

FIG. 23 is a simplified schematic of a spectator mode system 2300 according to another embodiment of the present invention. Spectator mode system 2300 is substantially similar to spectator mode system 100 shown in FIG. 1, except that spectator mode system 2300 is configured to provide video streams and audio streams 2305, and metadata streams 2310 to a web client operating on a web console 2315. Web console 2315 may be a web-enabled game console, a web-enabled portable device (e.g., a smart phone), a computer, or the like. The web client operating on web console 2305 may be configured to provide substantially similar user selectable options for compositing video streams, audio stream, and/or metadata streams as the user selectable option described above with respect to FIGS. 1-21. According to one embodiment, spectator mode system 2300 includes first and second player computers 105 and 110, and a set of spectator computers 115. The first and second player computers 105 and 110 may be a source of a live game stream 160. Spectator mode system 2200 may include other sources (e.g., a sports broadcaster, a recorded video archive, etc.) of event streams, such as live sports streams and recorded streams. The spectator computers may be game consoles, such as Play Station Three™ game consoles. Spectator mode system 2300 may also includes a commentator computer 120, a media server 125, and a game lobby server 130. According to one embodiment, the metadata streams generated by the spectator computers and/or the commentator computer may be transmitted from these computers to a game broadcast web server 2325, which may be configured to transmit the metadata stream in a web formatted transport stream to the web client. The video streams and audio streams generated by the player computers and/or the spectator computers may be transmitted from these computers to the media server, which in turn may be configured to transmit these event streams to a streaming partner server 2330, which in turn is configured to transmit these event streams to the web client. According to one embodiment, the game broadcast server 2225 and the streaming partner server 2330 may be the same server.

Figure 24:
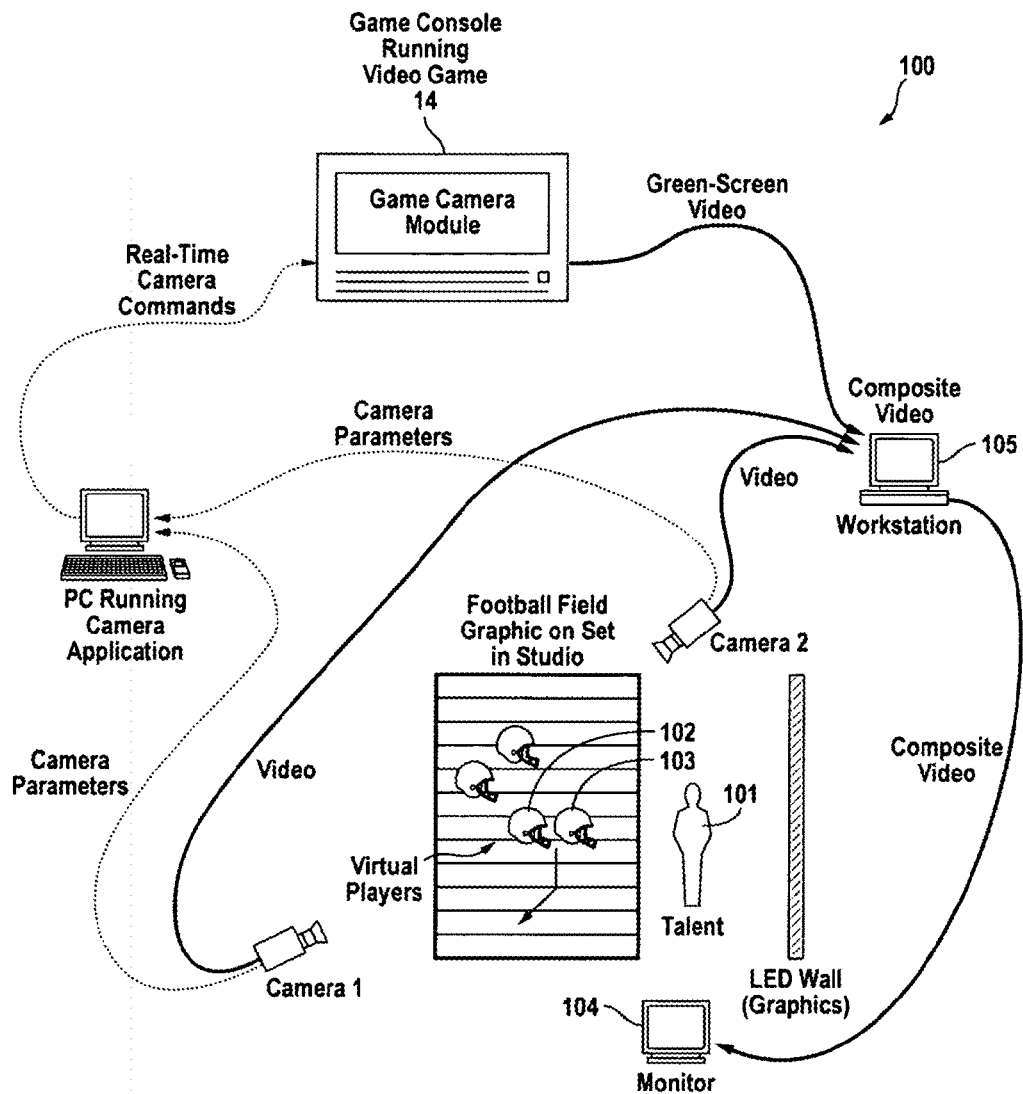
FIG. 24 is a diagram illustrating, in accordance with an embodiment of the invention, a system for using data-driven real time game camera editing and playback to combine three dimensional video game graphics with broadcast images taken in a studio.

Various embodiments configured to composite two or more video streams are described immediately below. FIG. 24 is a diagram illustrating, in accordance with an embodiment of the invention, a system for using data-driven real time game camera editing and playback to combine three dimensional video game graphics with broadcast images taken in a studio. The system as shown is located in a television broadcast studio. A commentator 101 ("talent") is standing in front of an LED wall that can be used for displaying graphics used in the television broadcast. A graphic representing a football field is located on the floor of the studio set. A first camera (Camera 1) is aimed at the studio scene as shown and records the football field graphic along with the commentator 101. A second camera (Camera 2) is aimed at the studio scene as shown and records the football field graphic along with the commentator 101 from a different angle as shown. Camera parameters are sent from a first camera (Camera 1) and a second camera (Camera 2) to a computer that is running a camera application which translates the camera parameters into real-time camera commands that can be understood by an in-game camera module installed on game device 14, for example, a game console. Game device 14 is described in more detail in FIGS. 27 and 28A-28C below.

Game console 14 provides a green screen version of video recorded by the game camera. For this example, the game console has been loaded with a football game, such as Madden™, published by Electronic Arts Inc., and the green screen video shows a particular play being executed. Particular plays can be selected through the game user interface, and multiple game play scenarios can be recorded by the game camera. It should be noted that Camera 1 and Camera 2 are different from the game camera. Examples of Cameras 1 and 2 include video camera hardware such as that used by a television studio to record events. The game camera is used for showing a field of view in a video game, and can be programmed to show various views.

The game play that is recorded by the in-game camera can be processed as a green screen video. The green screen video shows the game play without the game environment (for example, a particular football stadium as can be selected within the game), so that the game characters are more easily seen when they are projected onto a different scene. In the example shown in FIG. 24, the green screen video from the game is combined with the video obtained from Camera 1 and Camera 2 to create a composite video which is a combination of the studio scene and the green-screen video from the game console. The composite video output is displayed to workstation 105 and monitor 104 and appears as a football game being played inside the studio with the commentator 101 standing near the game players, the graphics on the LED wall being displayed behind him. In an embodiment of the invention, the compositing is two dimensional and the commentator generally appears to be located behind the players, rather then in the middle of the game play.

Figure 25A:
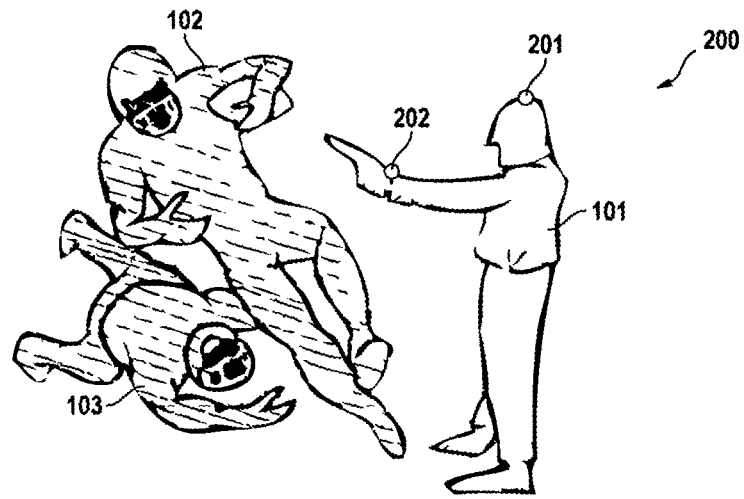
FIGS. 25A and 25B are diagrams illustrating a combined view of three dimensional game elements (football players) from a video game and a commentator (person pointing) who is being filmed in a broadcast studio.
Figure 25B:
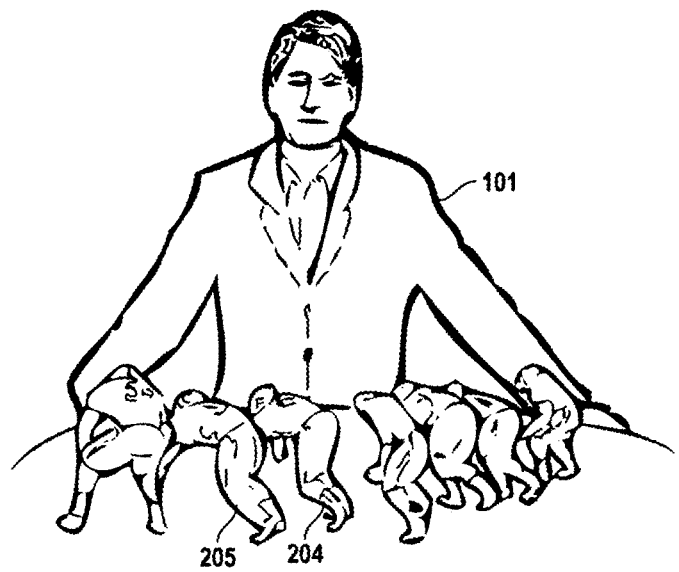

FIGS. 25A and 25B are diagrams each illustrating a combined view of a plurality of three dimensional game elements (football players) from a video game and a commentator (person pointing) who is being filmed in a broadcast studio. This combined view appears such that the commentator 101 is present on the field with the football players 102, 103, and is in the midst of the action of the play currently being executed. This provides the commentator 101 with the ability to "step into" the game action and point out areas of interest. For example, in FIG. 25A the commentator 101 in this scenario can point out that player 102 is getting tackled by player 103. In FIG. 25B, players 204 and 205 are running away from the commentator 101.

In an embodiment of the invention, the commentator can be "placed" in the middle of game play by wearing motion capture markers 201, 202 in a real-time motion capture space that can be used to capture his movement around the studio. In one example, the real-time motion capture space can be approximately 30 feet by 30 feet in size. It is understood that numerous other motion capture space sizes may also be appropriate. Motion capture markers (or sensors) can be located at various points on the commentator's body, for example, motion capture marker 201 is on the top of the commentator's head, and motion capture marker 202 is on the commentator's wrist. Any motion capture technology is suitable for use with this embodiment of the invention, and is not intended to be limited to methods which require the use of motion capture markers.

The three dimensional position data associated with the commentator can be fed into the video game simulation running on game console 14. The game simulation can then process the commentator's position data so that the commentator will appear in the right position relative to the rest of the players, thus providing more realism in the scene. If the game simulation is running live, then the commentator could interact with other virtual players by way of the position data input. For example, the commentator could slap a virtual player in the head, and that virtual player could be shown as responding to the commentator's actions.

Figure 26:
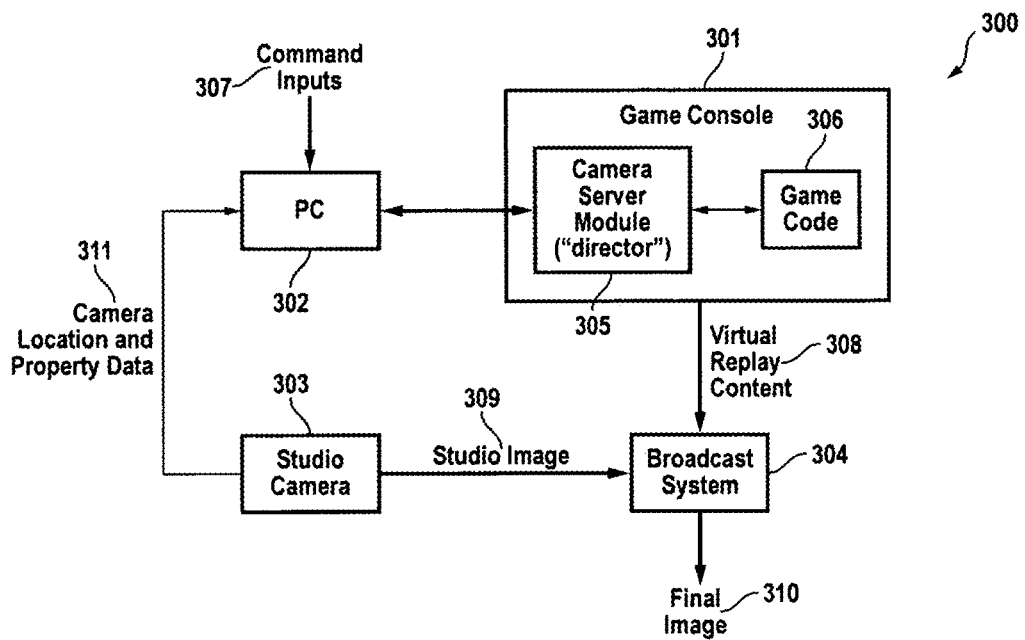
FIG. 26 is an exemplary block diagram illustrating a system for providing video game based replays in a broadcast environment such as that pictured in FIG. 24.

FIG. 26 is an exemplary block diagram which illustrates a system 300 for providing video game based replays in a broadcast environment such as that pictured in FIG. 24. The system as shown includes a video game console 301, a client user interface 302 (shown as a personal computer), a studio camera 303, and a broadcast system 304. The video game console includes a camera server module 305 (a.k.a. the "director") and a game code module 306. The game code module 306 is the video game software, for example, the game Madden™ described above. The camera server module 305 provides in-game camera views in response to inputs received from the client user interface 302. These in-game camera views are used in connection with the video game to produce various replays of the action happening in the game.

The inputs 307 entered into the client user interface 302 determine what data is passed back and forth between the client user interface 302 and the camera server module 305. These inputs 307 include, for example, virtual playbook commands which utilize a standard network socket for communication. Virtual playbook commands and examples of their application are described in further detail below. In the example shown in FIG. 24, virtual playbook commands are entered into the personal computer and are used to select virtual replay content 308 from the game. The camera server module 305 responds to virtual playbook commands by directing the in-game camera to provide requested replays 308 from the game. In the example shown in FIG. 24, the requested replays 308 include videos of the players against a green background. The game environment (football stadium background) is removed from the video so that only the players remain. This virtual replay content 308 provides one input to a broadcast system 304, as shown.

The other input to the broadcast system 304 is a studio image 309. The studio image 309 is the background image for the composited video output 310 from the broadcast system 304. The studio image 309 is the video taken by the studio cameras 303, Camera 1 and Camera 2, described above in FIG. 24. In the example of FIG. 24, the studio cameras 303 provide real world video of a commentator standing in a broadcast studio as a background image. The studio cameras 303 send current location and camera-related property information 311 to the client input device 302, shown as a personal computer.

The data from the studio cameras describes the location, orientation and zoom of each physical camera. This data is captured by a device that is specifically set up to gather and interpret this data. Once this information is gathered, it can be adjusted and translated into commands that the Director uses to position the in-game virtual cameras. This data is then sent from either the capture device, or via some broker that is connected remotely to the Director. The director then uses the commands to set the virtual camera to correlate the application view with the physical camera view. The image from the application renders the involved objects against a green screen and outputs this video image. The application green screen image is then processed to make the green transparent and the result image is then overlaid on top of the physical camera image. The result is that the virtual world appears as if it is a part of the real world. As the physical camera moves, the Director camera moves in-step creating the illusion that the virtual objects are physically present in the real world. The broker or camera data capture device can potentially track multiple physical cameras and switch which data feed is translated and sent to the director through the broker. A setup as described would allow the result image to cut between multiple physical cameras while still maintaining the illusion that the virtual objects were 'physically' present in the real world.

The studio cameras are distinguished from the in-game cameras described above. The in-game cameras record what is happening in the video game, while the studio cameras record what is happening in the broadcast studio.

The broadcast system then composites the two images, the studio (background) image and the virtual replay content, into a final image which is shown on the monitor 104 and workstation 105 shown in FIG. 24. This final image can be broadcast to a cable television audience via known broadcast channels.

While a broadcast system 304 is shown as the compositing device, it should be noted that any device capable of performing compositing, such as chroma key compositing, can also be used for this purpose. The client user interface 302 is shown as a personal computer, but could alternatively be another suitable device such as another game console, another type of computer, or a handheld computing device. It should also be noted that the camera server module 305 could also be a standalone module rather than a module that resides on a game console or other similar device.

The virtual playbook commands provide a protocol for communicating with a client device, and include the following types of commands: system commands, visibility commands, replay control commands and state relay commands.

System commands provide the mechanism for controlling the main game features supported in the virtual playbook technology package. These features include turning the virtual playbook features on/off, enabling/disabling use of remote cameras to render each game frame (as opposed to using the standard game cameras), enabling/disabling green screen and blue screen render features, enabling/disabling the rendering of game user interface screens, and enabling/disabling the rendering of game specific debug text.

Visibility commands control the visibility of objects in the virtual world defined by the game. In the context of a sports game, the visibility commands control the visibility of individual players, the ball, the field, game-specific entities, plus the out-of-bounds range.

Replay control commands control various aspects of the replay playback, such as the replay time and the replay playback speed.

State relay commands provide the mechanism for transmitting the current state of the game back to the client user interface. These commands include a send state enable (to turn this feature on/off), and the ability to transmit information about the following states: current game system state, team data, replay state, individual player state and a generic game entity state.

An example of a plurality of virtual playbook commands are described in detail in the following paragraphs.

Issuing a Command

The Virtual Playbook technology utilizes a standard network socket for all communication with a controlling PC or other device. The method of connecting to the game using a socket generally varies depending on the client application, but the client device should understand the protocol for transmitting data in a way that the Virtual Playbook system can understand it.

Commands that are issued or communication that is sent from the game server to the connected client are formatted with a basic XML tag structure. The commands are our byte identifiers that are placed in the 'n' field of the XML tag. Arguments that are associated with the specific command are placed in the 'v' field of the tag. The tag value of T is used to identify the command tag. An issued command takes the following form:

<t n="<command>" v="<arguments>"/>

An example of this command structure is as follows. Sending the following command to the game over the Virtual Playbook connection will enable the green screen rendering feature:

<t n="vpgs" v="1"/>

A command that is not properly formatted will not be interpreted by the game and it will be discarded. If an improper number or type of arguments is provided to a command, unexpected behavior may occur. It is therefore important that commands are checked for proper arguments and formatting before they are sent to the game.

System Level Commands

The following commands provide the mechanisms for controlling the main game features supported in the Virtual Playbook technology package. The system commands exhibit the enable and disable pattern. The status of a feature can be relayed back to the connected PC via the send state command. Details on the use of the state sending system can be found in that section of this document.

The following is a list of examples of supported system level commands followed by detailed listings of each command and its use:

vpen—Virtual Playbook Enable
vpce—Camera System Enable
vpgs—Green Screen Rendering Enable
vpbs—Blue Screen Rendering Enable
vpui—User Interface Rendering Enable
vpdt—Debug Text Rendering Enable
vpen
  Arguments: "1" to enable, "0" to disable
  Description: Enables or disables all Virtual Playbook features.
  Example: <t n="vpen" v="1"/>
  Notes: When disabling the Virtual Playbook features using this command, all game settings will be restored to their previous state. Any visibility states for the UI, debug text, etc. will be re-enabled as will all player and game entity visibility states. Disabling the Virtual Playbook feature will also disable any green or blue screen render states that have previously been set.
vpce
  Arguments: "1" to enable, "0" to disable
  Description: Enables or disables the use of the remote controlled cameras to render each frame.
  Example: <t n="vpce" v="1"/>
  Notes: By default, the standard game cameras are used to render each game frame. The game cameras provide a view of the game that is consistent with the specific game engine running Creating a connection to the game on the camera specific port allows you to control the game cameras remotely by issuing commands to the game over that connection. In order to use your camera view, issue the vpce over the Virtual Playbook connection to switch the game over to use your view.
vpgs
  Arguments: "1" to enable, "0" to disable
  Description: Enables or disables the green screen render feature.
  Example: <t n="vpgs" v="1"/>
  Notes: The green screen feature can be enabled or disabled without previously enabling the Virtual Playbook features. The current state of the green screen feature will be returned in a game data packet if the send data command was previously issued.
vpbs
  Arguments: "1" to enable, "0" to disable
  Description: Enables or disables the blue screen render feature.
  Example: <t n="vpgs" v="1"/>
  Notes: The blue screen feature can be enabled or disabled without previously enabling the Virtual Playbook features. The current state of the green screen feature will be returned in a game data packet if the send data command was previously issued.
vpui
  Arguments: "1" to enable, "0" to disable
  Description: Enables or disables rendering of the game user interface screens.
  Example: <t n="vpui" v="1"/>
  Notes: The user interface visibility can be shown or hidden without previously enabling the Virtual Playbook features. The current visibility state of the user interface will be returned in a game data packet if the send data command was previously issued.
vpdt
  Arguments: "1" to enable, "0" to disable
  Description: Enables or disables rendering of any game specific debug text.
  Example: <t n="vpdt" v="1"/>
  Notes: The debug text visibility can be shown or hidden without previously enabling the Virtual Playbook features. The current visibility state of the debug text will be returned in a game data packet if the send data command was previously issued.

Visibility Commands

The following commands provide mechanisms for controlling the current visibility of the majority of the objects within the game world. The visibility status of entity or system can be relayed back to the connected PC or other client input interface via the send state command. Details on the use of the state sending system can be found in that section of this document.

The following is a list of examples of supported visibility commands followed by detailed listings of each command and its use:

vppv—Individual Player Visibility Control
vpbv—Ball Visibility Control
vpfv—Field Visibility Control
vpev—Game Specific Entity Visibility Control
vpom—Out-of-Bounds Range Set
vpeo—Out-of-Bounds Automatic Visibility Control Enable vppv
Arguments: "<player_index>,<visibility_state>"
player_index—The numeric index of the player to set the visibility state of (if a negative value is provided, all players will be set to the specified visibility state)
visibility_state—"1" to make the specified player visible, "0" to hide the player
Description: Shows or hides the player that is associated with the specified index. If a negative index is provided, all players will be set to the specified visibility state.
Example: <t n="vppv" v="5,0"/>
Notes: If the send state command was issued, the current player information will be relayed back to the connected PC from the game. This information will contain the player name, number, position, team, location and visibility state. The indices relayed back from the game correspond directly to the indices that the player visibility command uses to resolve the player.

vpbv
Arguments: "1" to make visible, "0" to hide
Description: Shows or hides the game ball or related game entity.
Example: <t n="vpbv" v="1"/>
Notes: The current ball entity state will be relayed back over the Virtual Playbook connection if the send state command was previously issued. The entity information will contain the name, location and visibility state of the ball entity.

vpfv
Arguments: "1" to make visible, "0" to hide
Description: Shows or hides the field or related game entity.
Example: <t n="vpfv" v="1"/>
Notes: The current field visibility state will be relayed back over the Virtual Playbook connection if the send state command was previously issued. The information will be packed into the game data packet.

vpev
Arguments: "<entity_index>,<visibility state>"
entity_index—The numeric index of the entity to set the visibility state of. This index is generally specific to the available entities in the game
visibility_state—"1" to make the specified entity visible, "0" to hide the entity
Description: Shows or hides the specified entity.
Example: <t n="vpev" v="0,1"/>
Notes: A game provides a specific set of entities that are available through this command. The entity names, visibility state and location will be returned over the Virtual Playbook connection in an entity data packet if the send data command was previously issued.

vpom
Arguments: "<minX>,<minY>,<minZ>,<maxX>,<maxY><maxZ>"
minX, minY, minZ—These values represent the minimum X, Y and Z world coordinates where a game entity will be visible if the out-of-bounds feature is enabled
maxX, maxY, maxZ—These values represent the maximum X, Y and Z world coordinates where a game entity will be visible if the out-of-bounds feature is enabled
Description: Sets the minimum and maximum coordinate ranges where entities are visible if the out-of-bounds feature is enabled. If an entity moves outside of this range when the feature is enabled, the entity will be hidden.
Example: <t n="vpom" v="−10,−1,−20,10,1,20"/>
Notes: The default values for the out-of-bounds range are zero. If the feature is enabled without setting a valid range, all game entities will be invisible. The range does not reset when disabling the Virtual Playbook system, but the feature itself is disabled in that case.

vpeo
Arguments: "1" to enable, "0" to disable
Description: Enables or disables the out-of-bounds feature. The out-of-bounds system allows a range of entity coordinate values to be set where game entities are visible. If the entities move outside of the region, they are hidden.
Example: <t n="vpgs" v="1"/>
Notes: If out-of-bounds is enabled, any entity visibility that is set using the associated commands will no longer apply. This feature does not maintain any manual state of entity visibility and will destroy any manual changes if enabled. The current state of the out-of-bounds feature will be returned in a game data packet if the send data command was previously issued.

Replay Control Commands

The following commands provide mechanisms for controlling replay playback. The current replay and replay control states can be relayed back to the connected PC or other client input interface via the send state command.

The following is a list of all supported replay control commands followed by detailed listings of each command and its use:

vprt—Set Current Replay Time
vprs—Set Current Replay Playback Speed vprt
Arguments: "<time_in_seconds>"
time_in_seconds—The current time to set the replay playback to in seconds (floating point value)
Description: Sets the current time of replay playback (if a replay is currently playing) to the specified value. The argument value is a time in seconds within the replay range. Values will be clamped to zero and the total replay length if they are not within that range.
Example: <t n="vprt" v="1.5"/>
Notes: The replay time feature can be used without previously enabling the Virtual Playbook features and at any time a replay is playing back in the game. The current replay length and the current replay time are sent by the game each frame in a replay data packet if the send state command was previously issued.

vprs
Arguments: "<playback_factor>"
playback_factor—The rate of speed at which the replay will play back (floating point value)

Description: Sets the current replay playback speed to the provided value. A replay playback speed of 1.0 will cause the replay to play back in real time. Negative values cause the replay to play back in reverse from the current position. The replay will stop playback when either the beginning or end frame of the recorded data is reached. Sending a speed of zero stops replay playback.

Example: <t n="vprs" v="0.5"/>

Notes: The replay speed feature can be used without previously enabling the Virtual Playbook features and at any time a replay is playing back in the game. The current replay playback speed is sent by the game each frame in a replay data packet if the send state command was previously issued.

State Relay Commands

The following commands provide mechanisms for relaying the current state of the game back to the connected PC or other client input interface. Once a connection is established to the game, this state transmission must be enabled using the send state command to activate it.

The following is a list of all supported state transmission commands followed by detailed listings of each command and its use:

vpss—Send State Enable
vpsg—Current Game System State Relay
vptd—Team Data Relay
vpsr—Replay State Relay
vpsp—Individual Player State Relay
vpse—Generic Game Entity State Relay vpss
Arguments: "1" to enable, "0" to disable
Description: Enables or disables sending the current state of all Virtual Playbook systems over the connection.

Example: <t n="vpss" v="1"/>

Notes: The Virtual Playbook system must currently be enabled by issuing the enable command prior to issuing this command for the game to send the per-frame state over the connection. This command will enable the transmission of the game, player, entity, team and replay data each frame over the Virtual Playbook connection. If the game detects errors in transmitting the data, this feature will be automatically disabled and will have to be re-enabled once a connection is re-established.

vpsg
Arguments: "<vp_enabled>,<simFPS>,<renderFPS>, <greenscreen>,<bluescreen>,<field>,<ui>,<text>, <cameras>,<oob>, <minX>,<minY>,<minZ>, <maxX>,<maxY>,<maxZ>"
vp_enabled—"1" if Virtual Playbook is enabled, "0" if disabled
simFPS—The current frame rate for the game simulation
renderFPS—The current frame rate for the game render loop
greenscreen—"1" if green screen is enabled, "0" if disabled
bluescreen—"1" if blue screen is enabled, "0" if disabled
field—"1" if the field (or associated entity) is visible, "0" if hidden
ui—"1" if the user interface is visible, "0" if hidden
text—"1" if any game debug text display is visible, "0" if hidden
cameras—"1" if the remote controlled cameras are being used, "0" if the game cameras are in use
oob—"1" if the out-of-bounds feature is enabled, "0" if disabled
minX—floating point value of the minimum X coordinate of the out-of-bounds feature
minY—floating point value of the minimum Y coordinate of the out-of-bounds feature
minZ—floating point value of the minimum Z coordinate of the out-of-bounds feature
maxX—floating point value of the maximum X coordinate of the out-of-bounds feature
maxY—floating point value of the maximum Y coordinate of the out-of-bounds feature
maxZ—floating point value of the maximum Z coordinate of the out-of-bounds feature Description: This command allows the game to reflect the current state of the Virtual Playbook features back to the PC over the Virtual Playbook connection.

Example: <t n="vpsg" v="1,60.0,60.0,1,0,0,0,0,1,0,−10.0,−1.0,−20.0,10.0,1.0,20.0"/>

Notes: If the send state command was issued, this packet will be dispatched from the game per-simulation frame to the client PC. This data can be used to check the state of any systems to see if the issued commands were received and interpreted properly by the game.

vptd
Arguments:
"<home_index>,<home_city>, <home_teamname><home_gamestate><away_index>, <away_city>, <away_teamname>,<away_gamestate>"
home_index—The game-specific index of the home team
home_city—The text name of the city of the home team
home_teamname—The text name of the home team
home_gamestate—A text value indicating the game-specific state of the home team (i.e. offense\defense)
away_index—The game-specific index of the away team
away_city—The text name of the city of the away team
away_teamname—The text name of the away team
away_gamestate—A text value indicating the game-specific state of the away team (i.e. offense\defense)

Description: This command allows the game to reflect any team specific information to the PC over the Virtual Playbook connection.

Example: <t n="vptd" v="0,New England,Patriots,Offense,1,Indianapolis,Colts,Defense"/>

Notes: If the send state command was issued, this packet will be dispatched from the game per-simulation frame to the client PC. Not all games that support the Virtual Playbook features have the concept of teams and this data is subject to change on a per-game basis.

vpsr
Arguments: "<length>,<time>,<speed>"
length—The length of the current replay in seconds (floating point value)
time—The current time of replay playback in seconds (floating point value)
speed—The current speed of replay playback (floating point value)

Description: This command allows the game to reflect the current replay information to the PC over the Virtual Playbook connection.

Example: <t n="vpsr" v="14.0,1.5,0.5"/>

Notes: If the send state command was issued, this packet will be dispatched from the game per-simulation frame to the client PC. If the game is not currently playing back a replay, the argument values will all be zero.

vpsp
Arguments:
"<team_index>,<player_team_index>,<position>,<firstname>,<lastname>, <number>,<visible>,<x>,<y>, <z>"

team_index—The index of the team this player is on (corresponds to the team data packet index)

player_team_index—The index of the player on the player's team position—Text value indicating the position of the player on the team (i.e. QB)

firstname—The player's first name lastname—The player's last name number—The jersey number of the player (if applicable, if not zero)

visible—"1" if the player is visible, "0" if the player is hidden x—The X coordinate of the player in the game world y—The Y coordinate of the player in the game world z—The Z coordinate of the player in the game world Description: This command allows the game to reflect information about each player in the game to the client PC over the Virtual Playbook connection.

Example: <t n="vpsp" v="1,5,QB,Tom,Brady,12,1,1.0,0.0,20.0"/>

Notes: If the send state command was issued, this packet will be dispatched from the game for each player per-simulation frame to the client PC. The command to set the player visibility uses an absolute player index which is different from the index provided in this data packet. In order to translate the player team index to an absolute index, the team index multiplied by the number of players on a team must be added to the player team index.

vpse

Arguments: "<entity_index>,<name><visible>,<x>,<y>,<z>"

entity_index—The game specific index of the entity name—The name of the entity visible—"1" if the entity is visible, "0" if the entity is hidden x—The X coordinate of the entity in the game world y—The Y coordinate of the entity in the game world z—The Z coordinate of the entity in the game world Description: This command allows the game to reflect information about each generic entity in the game to the client PC over the Virtual Playbook connection.

Example: <t n="vpse" v="0,Ball,1,1.0,0.0,20.0"/>

Notes: If the send state command was issued, this packet will be dispatched from the game for each game specific generic entity per-simulation frame to the client PC. Each game will provide a different list of available entities and therefore this data must be interpreted on a per-game basis.

Figure 27:
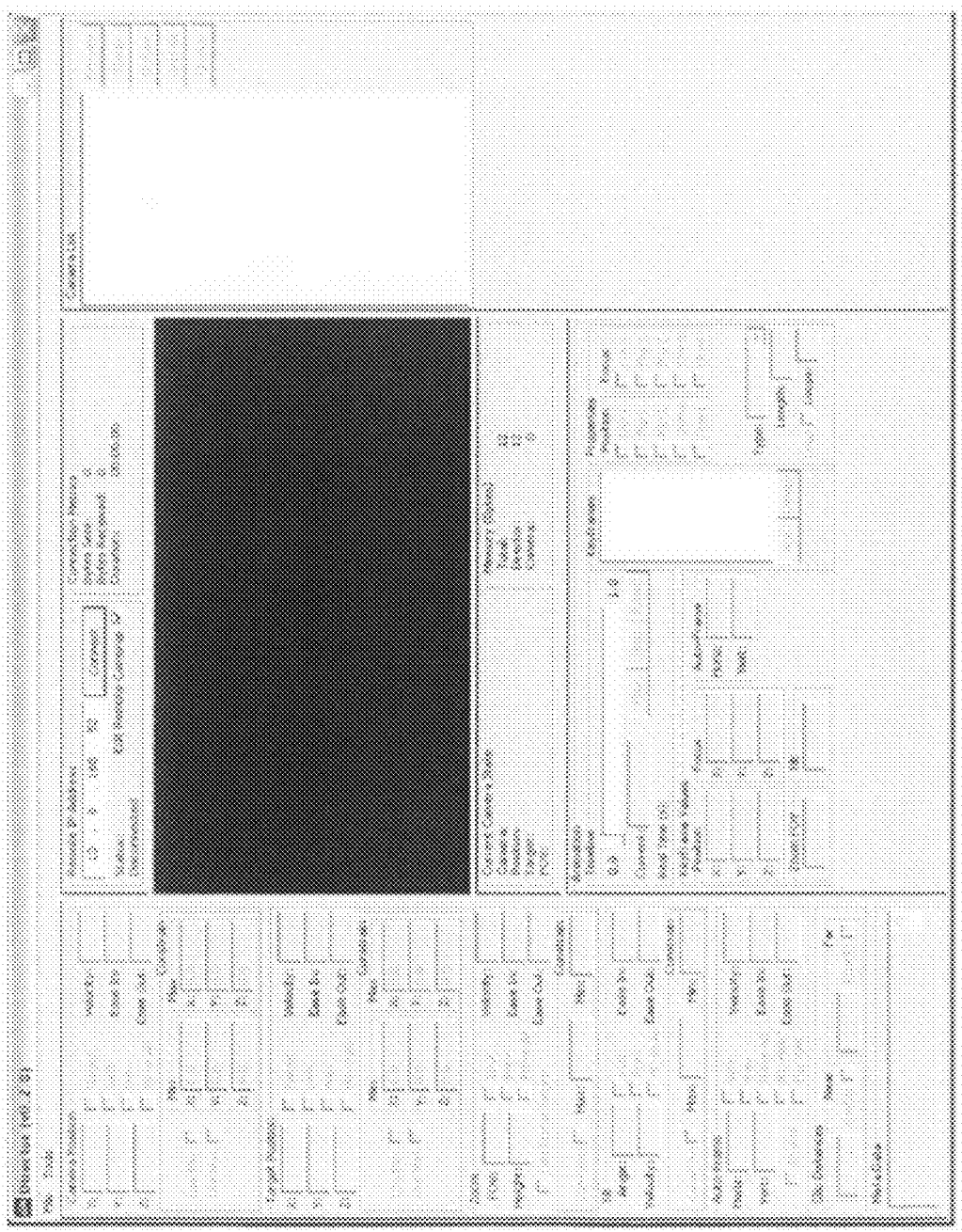
FIG. 27 is a diagram illustrating an exemplary graphical user interface for providing input to the system of FIG. 26.

FIG. 27 shows an example of a graphical user interface that may be used for quickly selecting and monitoring attributes associated with creating custom cameras for various purposes. For example, a user can select, edit and monitor a variety of attributes through such a user interface, including camera position, target position, zoom, tilt, auto-frame, clip distances, meta data, remote network connection information, camera state, memory usage, animation information, key frame information and a list of existing cameras.

Positions are usually represented as X, Y, Z locations in a three-dimensional space.

Constraints can be placed on the positions by selecting minimum and maximum X, Y and Z coordinates. With respect to target positions, (used for example, if it is desired to track a particular player or an object, such as a football), the user can select "ease in," "ease out" and velocity criteria.

Remote IP addresses may be entered for purposes of connecting to other devices, for example if editing remote cameras is desired. Connection metrics may be shown as output in order for the user to see statistics such as bytes sent and received. Other output may include the current camera state (including the camera name, position, target and field of view (FOV)) and memory statistics (total, for the camera server module/director and for an individual camera).

Animations can be associated with a camera, for example, if the user desires to create an in-game camera that follows a particular path in the game environment. The user has control over various aspects of the animation, including key frame values (their positions and focus), the zoom FOV and tilt. The user can track key frames that have already been created by looking in the key frame list. When a user selects a key frame from the list, the properties of that key frame appear in the list of checkboxes to the right of the list. Such properties can include flipping around an axis (Flip X, Flip Y, Flip Z), orientation and heading. The user can also select the type, length and number of loops associated with a key frame.

An auto-frame feature allows the user to define an auto-frame by selecting horizontal and vertical criteria. When a camera is created, the math that is used to generate the transforms usually places the target point directly in the center of the screen. One way to adjust this would be to move the target point some arbitrary distance away from the camera's true target point. While a 3D adjustment like this would allow the camera author to get consistent framing (location of center of interest on the screen) in a static camera, if the camera is not moving along with the target the shot framing will change. As an example, if the camera was authored to place the target point 1.0 world units to the right of the point of interest with an intent of shifting the target into the left most third of the screen, the intended effect may work properly if the target is 5.0 world units away from the camera location, but will not be noticeable if the camera is 50.0 world units away. Using 3D shifts to alter the shot composition in screen-space will not provide consistent results.

Auto-framing uses a 2D screen-space shift to ensure consistent shot framing. The camera author defines a horizontal and vertical position on the screen that they want the target point to reside. The transforms are then adjusted every frame to ensure that the camera point of interest always stays at that location on the screen.

Figure 28A:
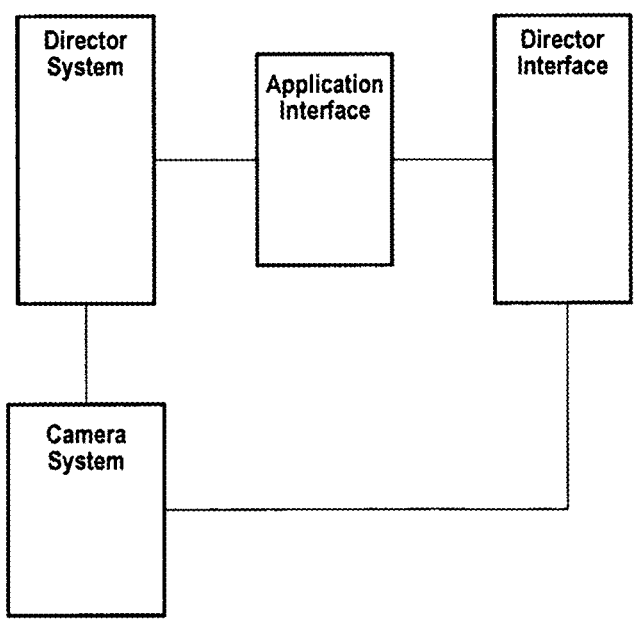
FIG. 28A is a UML diagram illustrating the architecture of the camera server module, a.k.a., the "Director.
Figure 28B:
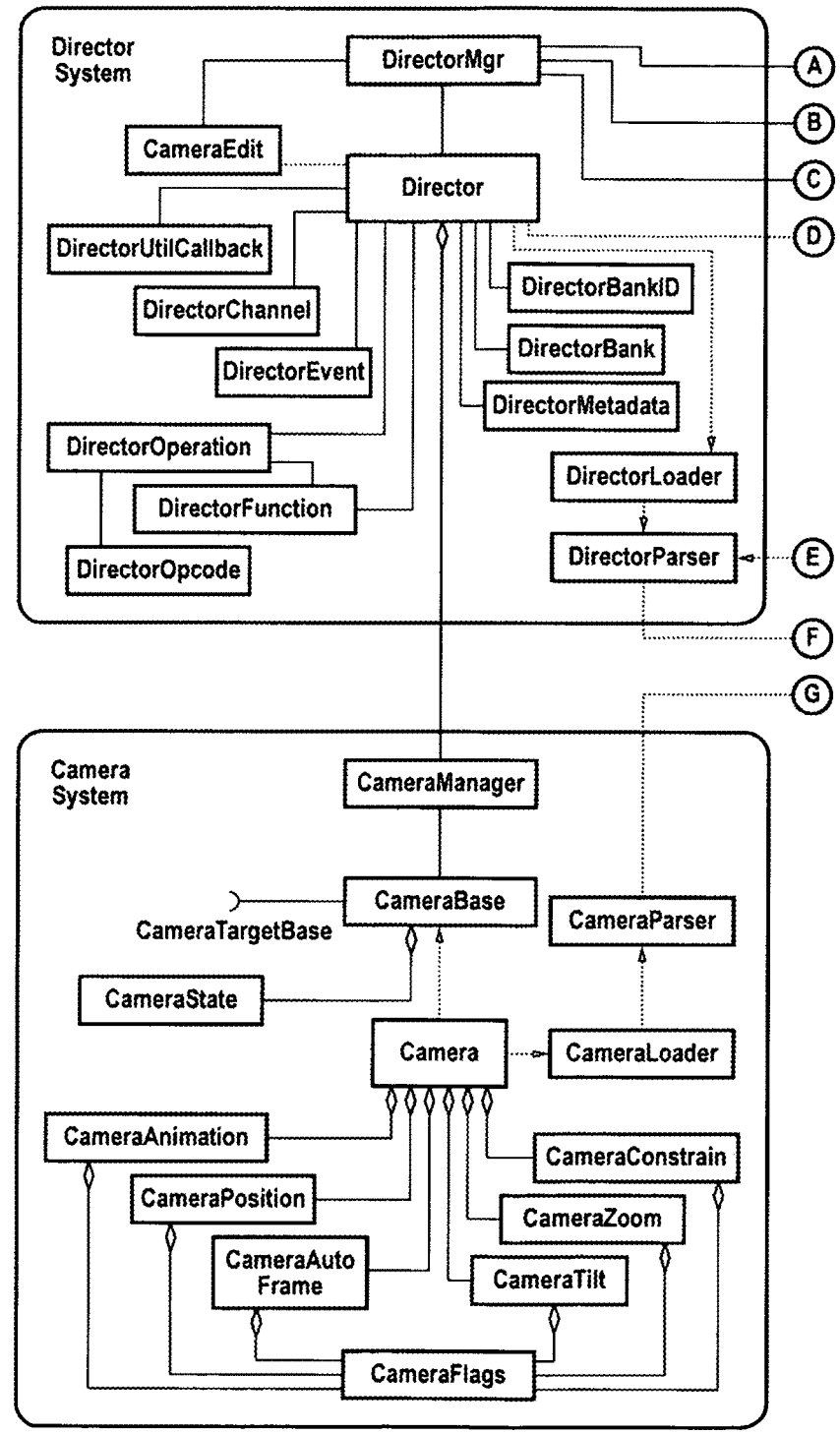
" FIG. 28B is a UML diagram illustrating an architecture of a director system and a camera system, according to some embodiments.
Figure 28C:
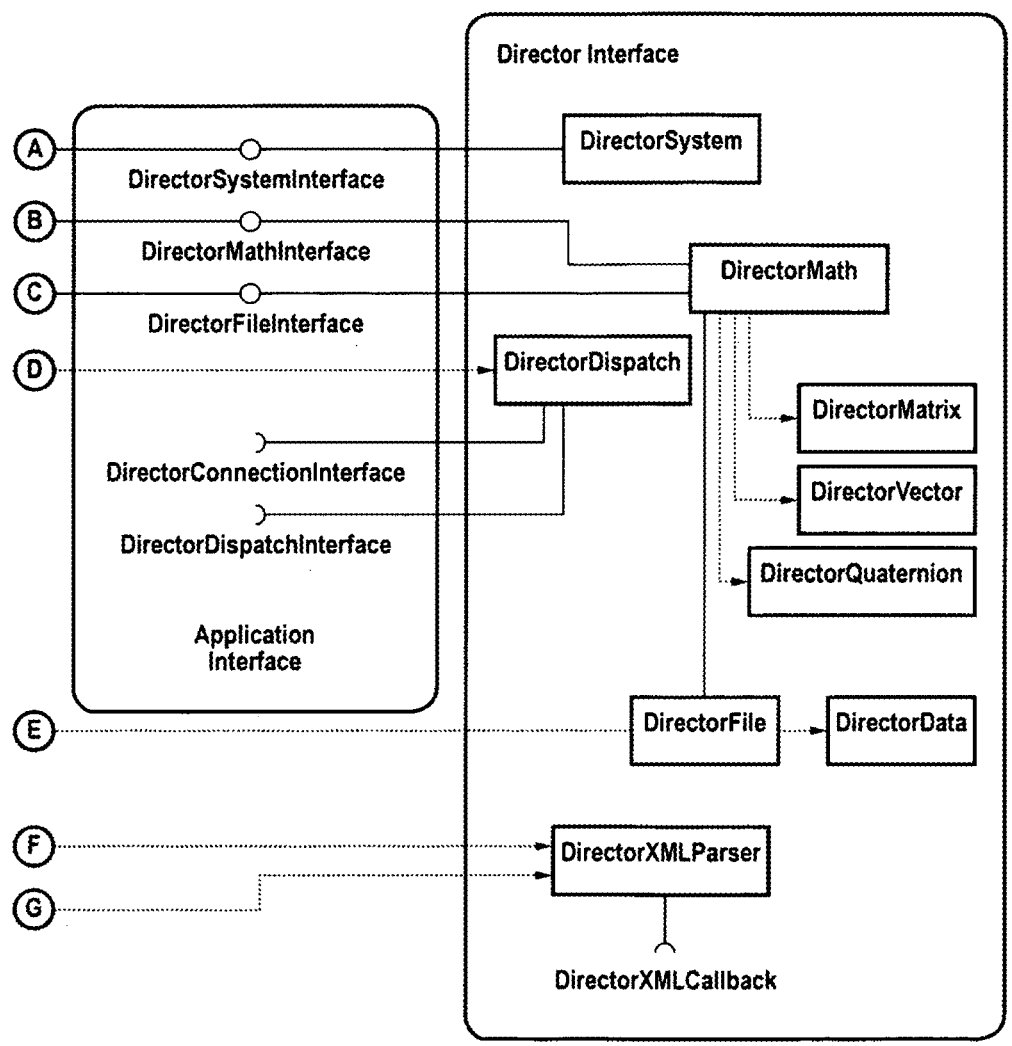
FIG. 28C is a UML diagram illustrating an architecture of an application interface and a director interface, according to some embodiments.

FIG. 28A is a block diagram illustrating the architecture of the camera server module. For convenience, the camera server module will be referred to as the "Director" in the description of the figure. The director system architecture includes the following components: a director system, a camera system, an application interface and a director interface. Inputs and outputs to the system go through the application interface, for example, the DirectorConnectionInterface accepts inputs from outside connections such as a network connection, a USB connection, or any other suitable connection which can provide input to the system. Outputs from the system go through the DirectorDispatch Interface. FIG. 28B is a UML diagram illustrating an architecture of a director system and a camera system, according to some embodiments. FIG. 28C is a UML diagram illustrating an architecture of an application interface and a director interface, according to some embodiments.

Figure 29:
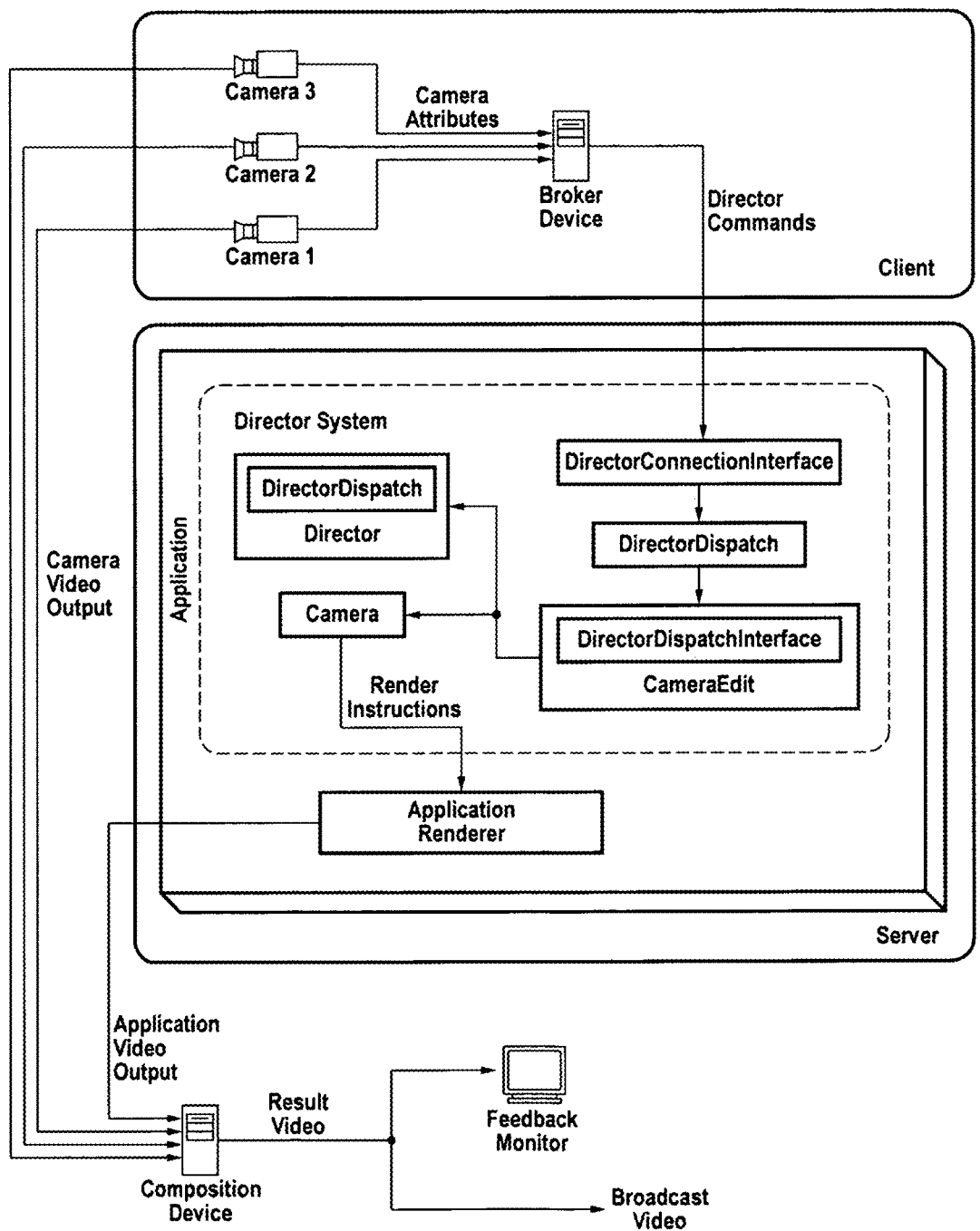
FIG. 29 is a block diagram illustrating an exemplary application of the Director architecture, such as that of the system described in FIGS. 24 and 26.

FIG. 29 is a block diagram illustrating an exemplary application of the Director architecture, such as that of the system described in FIGS. 24 and 25.

Figure 30:
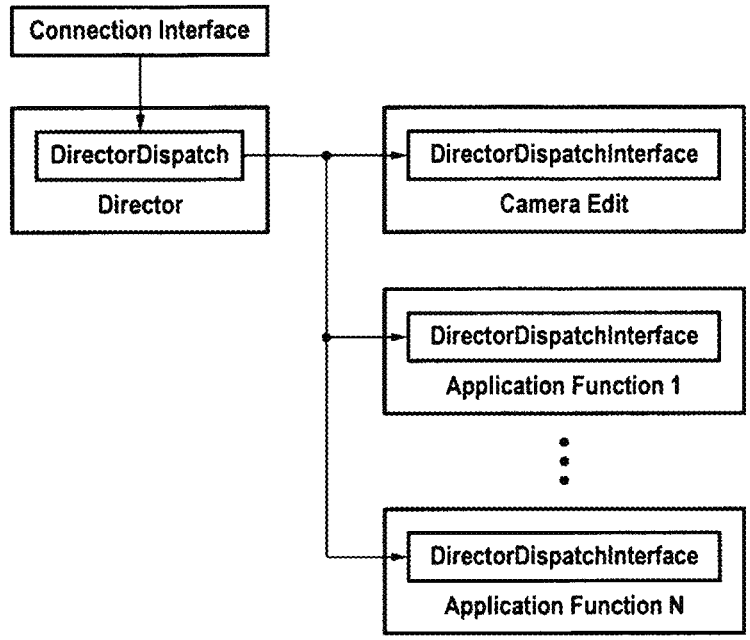
FIG. 30 is a block diagram illustrating an exemplary application of the Director architecture showing multiple Director dispatch interfaces used for processing multiple

FIG. 30 is a block diagram illustrating an exemplary application of the Director architecture showing multiple Director dispatch interfaces used for processing multiple application functions. In the diagram as shown, a camera edit application similar to that described in FIG. 29 is included, but in addition, director dispatch interfaces have also been created for 1-N different applications. The Director routes the input information from the connection interface through each of the multiple director dispatch interfaces until one of them indicates its ability to handle the specific commands and data being passed down. For example, if the input is specific to Application N, then the input is ignored by the dispatch interface associated with the Camera Edit application and is also ignored by dispatch interfaces associated with Applications 1 through N−1. When the input finally reaches the dispatch interface associated with Application N, it is finally processed.

If none of the existing dispatch interfaces can handle the input being passed down, the input is simply dumped and ignored by the system.

Figure 31:
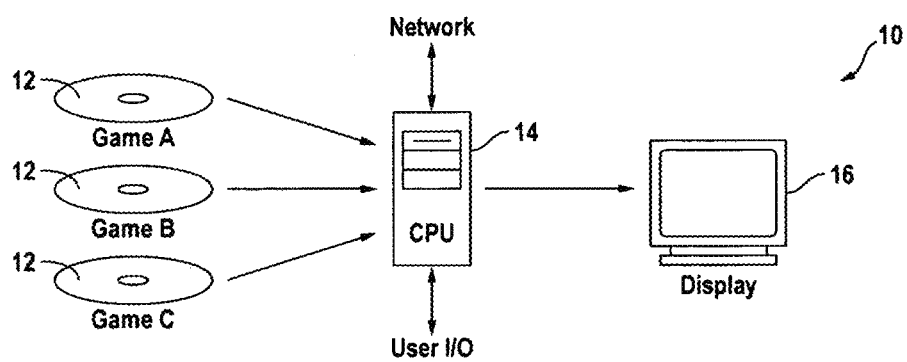
FIG. 31 illustrates a game system for providing one or more games for a user according to one embodiment of the present invention.

FIG. 31 illustrates a game system for providing one or more games for a user according to one embodiment of the present invention. System 10 is shown including one or more game media 12 (game A, game B, game C), a game device 14, and a display 16.

One or more game media 12 can include any game applications that may be used by game device 14 to involve a player in a game (and possibly also non-players who are also around). Each game medium 12 includes logic to provide a game, denoted as game A, game B, and game C. In one embodiment, the game provided by game device 14 is an electronic video game. Games are each individually stored on media, such as compact disk read-only memories (CDROMs), digital versatile disks (DVDs), game cartridges, or other storage media. A game, such as game A, is inserted in, coupled to, or in communication with game device 14 so that game device 14 may read all or part of a game application program code and/or related game data found on game media 12.

Game device 14 is a computing device that includes a processor, such as a CPU, and data storage combined or in separate elements. Game device 14 may be connected to a network that allows game device 14 to provide games that are not included on one or more game media 12. Thus, game A, game B, and game C may be accessed through the network and not be individually stored on game media 12. To allow a user to select from a plurality of available games, a display 16 might present a list of the games provided by game applications on game media 12. A game application may be also referred to as game code and/or a game program. A game application should be understood to include software code that game device 14 uses to provide a game for a user to play. A game application might comprise software code that informs game device 14 of processor instructions to execute, but might also include data used in the playing of the game, such as data relating to constants, images and other data structures created by the game developer. A user interacts with the game application and game device 14 through user input/output (I/O) devices.

Display 16 is shown as separate hardware from game device 14, but it should be understood that display 16 could be an integral part of game device 14. It should also be understood that game media 12 could be an integral part of game device 14. Game media 12 might also be remote from game device 14, such as where game media is network storage that game device 14 accesses over a network connection to execute code stored on game media 12 or to download code from game media 12.

Figure 32:
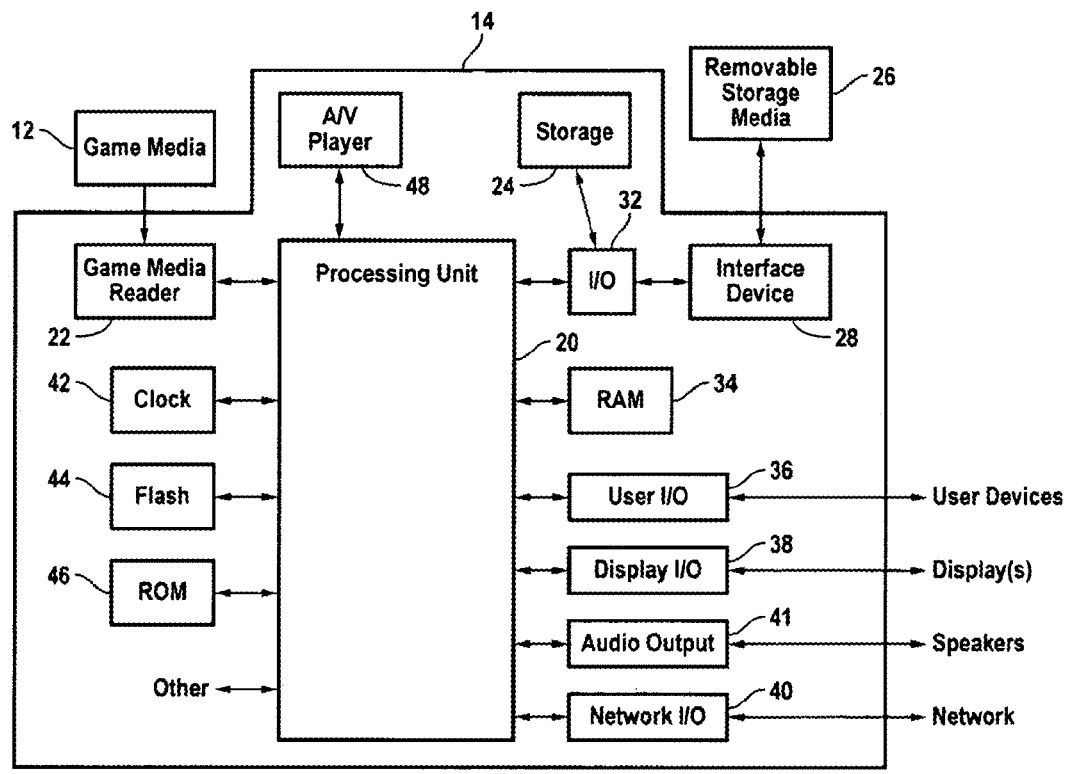
FIG. 32 illustrates a game device according to another embodiment of the present invention.

FIG. 32 illustrates a game device according to another embodiment of the present invention. It should be understood that other variations of game device 14 may be substituted for the examples explicitly presented herein and while the hardware might be essential to allow particular player interactivity, it is not essential to an implementation of the invention even if it is essential to the operation of it.

As shown, game device 14 includes a processing unit 20 that interacts with other components of game device 14 and also interacts with external components to game device 14. A game media reader 22 is included that communicates with game media 12. Game media reader 22 may be a CDROM or DVD unit that reads a CDROM, DVD, or any other reader that can receive and read data from game media 12.

Game device 14 also includes various components for enabling input/output, such as an I/O 32, a user I/O 36, a display I/O 38, and a network I/O 40. I/O 32 interacts with storage 24 and, through an interface device 28, removable storage media 26 in order to provide storage for game device 14. Processing unit 20 communicates through I/O 32 to store data, such as game state data and any data files. In addition to storage 24 and removable storage media 26, game device 14 includes random access memory (RAM) 34. RAM 34 may be used for data that is accessed frequently, such as game code when a game is being played. In one embodiment, the aggregate commands received by the local game system from the network may be persisted in any one or more of storage components, including memory or mass storage components.

User I/O 36 is used to send and receive commands between processing unit 20 and user devices, such as game controllers. Display I/O 38 provides input/output functions that are used to display images from the game being played. Network I/O 40 is used for input/output functions for a network. Network I/O 40 may be used if a game is being played on-line or being accessed on-line. Audio output 41 comprises software and/or hardware to interface to speakers (such as desktop speakers, speakers integrated in game device 14, earphones, etc.). A game device might also have audio inputs (not shown).

Game device 14 also includes other features that may be used with a game, such as a clock 42, flash memory 44, read-only memory (ROM) 46, and other components. An audio/video player 48 might be present to play a video sequence such as a movie. It should be understood that other components may be provided in game device 14 and that a person skilled in the art will appreciate other variations of game device 14.

Figure 33:
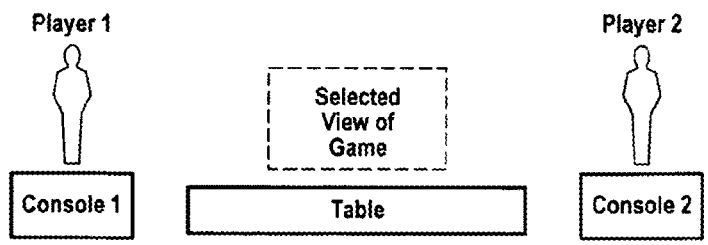
FIG. 33 illustrates an example of an application of a system incorporating the Director architecture described in FIG. 29.

FIG. 33 illustrates an example of an application of a system incorporating the Director architecture described in FIG. 29. FIG. 27 illustrates one example of how the system for can be used. The scenario shows two video game players, Player 1 and Player 2 playing on their own respective game consoles, Console 1 and Console 1. Consoles 1 and 2 could be game consoles, personal computers, or any other device capable of running a video game.

Spectators would be able to control a physical camera that is instrumented to gather its position and orientation data. That data would then be sent into the director over a connection in the same way it is done in a studio. This would allow the spectators to act like camera operators in the example. The resulting replay video can be composited with the video footage from the camera aimed at the players and the table such that the replay appears "on the table" for spectators to see. In this case, the spectators would not use the editable camera.

User Controlled Views

In addition to, or in place of, the above described features, a client-side sports player ("CSP") can be provided to viewers to receive complex media streams that allows for personalized sports viewing and interaction on a variety of platforms. For example, with a CSP, a user can watch streaming video or video-on-demand ("VOD") content related to a sports event, while allowing the user to customize their interaction and choice over how they watch a sport. In part, this is facilitated by the CSP's use of metadata about a broadcast. Viewers might have access to the opinions and content created by other viewers. They can chose to contribute opinions, analysis, and presentation style to a broadcast and make these available to others in the community or their friend's list.

Using a CSP provides for individual viewer control, allowing for example, a viewer to control on-field graphics and also control the camera. This is can provide Virtual Playbook functions, but also merging 3D graphics with real-world video such that the user can control how they view that content in various ways versus the current delivery format as only a linear video stream.

Users can provide social commentary appropriate for sports, such as telestrations, audio effects, and 3D objects to graphically illustrate an opinion with other viewers, or create custom replays and views that other sports fans can watch at their leisure. The player and ball position can be used to trigger animations and other graphical effects.

Since there is a live stream of data from a broadcast that is a sequence of unpredictable events, those can be used for driving a game that is not entirely determined by the sports event being broadcast (so users can provide inputs), but dependent on things that happen in the event (so the user has some unpredictable events to use in their interaction). One example is a "predict the play" game, but many other games are possible.

Believable athletic performances might be generated from 2D player tracking data.

Some embodiments of the CSP can bring 3D elements into the sports viewing experience in a simple and non-intrusive way. For example, the CSP can be a common and centralized unit for controlling and providing users a place to control the system to be able to, for example, find any video based on its attributes.

Based on the available metadata, the system can apply many interesting search criteria; so for example, users might be able to search for those games in which their favorite player is in action, or maybe something even more specific, like looking for those brief moments of a hockey game in which there was a fight.

While the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A computerized method comprising:
receiving, at a spectator computer, a plurality of independent data streams, the plurality of independent data streams including at least one video stream of gameplay of a video game between at least two player computers, the plurality of independent data streams further including a metadata stream, the metadata stream specifying a plurality of graphics options associated with one or more temporal positions in the gameplay of the video game, each of the plurality of graphics options associated with at least one of the one or more temporal positions, a particular one of the plurality of graphics options associated with a particular one of the one or more temporal positions being generated by a commentator at a commentator computer during a viewing by the commentator of a publicly available video stream of the gameplay of the video game;
receiving, at the spectator computer, a user selection of at least one of the plurality of graphics options associated with at least one of the one or more temporal positions;
combining and synchronizing, at the spectator computer, the video stream and one or more portions of the metadata stream specifying the at least one of the plurality of graphics options associated with the user selection to generate a composite stream, the synchronizing using the at least one of the one or more temporal positions associated with the at least one of the plurality of graphics options associated with the user selection; and
generating, at the spectator computer, a presentation based on the composite stream.

2. The computerized method of claim 1, wherein the method further comprises overlaying at least one of a plurality of graphics over at least a portion of a video of the gameplay, the at least one of the plurality of graphics being associated with the at least one of the plurality of graphic options associated with the user selection.

3. The computerized method of claim 2, wherein the plurality of graphics include text, telestrations, and ads.

4. The computerized method of claim 1, wherein the generating the presentation includes displaying the presentation based on the composite stream.

5. The computerized method of claim 1, wherein the plurality of independent data streams further includes an audio stream, and the metadata stream identifies a plurality of audio segments.

6. The computerized method of claim 5, further comprising:
combing and synchronizing at least one of the plurality of audio segments with the audio stream.

7. The computerized method of claim 6, wherein the audio stream is a part of the video stream.

8. The computerized method of claim 1, wherein one of the plurality of graphics options includes a three dimensional model of a player in the video game.

9. The computerized method of claim 1, wherein the video stream is of a recorded event or a live event.

10. A non-transitory computer readable storage medium containing program instructions that, when executed by a controller within a media server computer, cause the controller to execute a method for generating a composite stream, the method comprising:
receiving, at a spectator computer, a plurality of independent data streams, the plurality of independent data streams including at least one video stream of gameplay of a video game between at least two player computers, the plurality of independent data streams further including a metadata stream, the metadata stream specifying a plurality of graphics options associated with one or more temporal positions in the gameplay of the video game, each of the plurality of graphics options associated with at least one of the one or more temporal positions, a particular one of the plurality of graphics options associated with a particular one of the one or more temporal positions being generated by a commentator at a commentator computer during a viewing by the commentator of a publicly available video stream of the gameplay of the video game;
receiving, at the spectator computer, a user selection of at least one of the plurality of graphics options associated with at least one of the one or more temporal positions;

combining and synchronizing, at the spectator computer, the video stream and one or more portions of the metadata stream specifying the at least one of the plurality of graphics options associated with the user selection to generate a composite stream, the synchronizing using the at least one of the one or more temporal positions associated with the at least one of the plurality of graphics options associated with the user selection; and generating, at the spectator computer, a presentation based on the composite stream.

11. The computer readable storage medium of claim 10, wherein the method further comprises overlaying at least one of a plurality of graphics over at least a portion of a video of the gameplay, the at least one of the plurality of graphics being associated with the at least one of the plurality of graphic options associated with the user selection.

12. The computer readable storage medium of claim 11, wherein the plurality of graphics include text, telestrations, and ads.

13. The computer readable storage medium of claim 10, wherein the method further comprises displaying the presentation based on the composite stream.

14. The computer readable storage medium of claim 10, wherein the plurality of independent data streams further includes an audio stream, and the metadata stream identifies a plurality of audio segments.

15. The computer readable storage medium of claim 14, wherein the method further comprises:
combing and synchronizing at least one of the plurality of audio segments with the audio stream.

16. The computer readable storage medium of claim 15, wherein the audio stream is part of the video stream.

17. The computer readable storage medium of claim 10, wherein one of the plurality of graphics options includes a three dimensional model of a player in the video game.

18. The computer readable storage medium of claim 10, wherein the video stream is of a recorded event or a live event.

19. A computer program product on a non-transitory computer readable medium for generating a playable composite stream, the computer readable medium comprising:
code for receiving, at a spectator computer, a plurality of independent data streams, the plurality of independent data streams including at least one video stream of gameplay of a video game between at least two player computers, the plurality of independent data streams further including a metadata stream specifying a plurality of graphics options associated with one or more temporal positions in the gameplay of the video game, each of the plurality of graphics options associated with at least one of the one or more temporal positions, a particular one of the plurality of graphics options associated with a particular one of the one or more temporal positions being generated by a commentator at a commentator computer during a viewing by the commentator of a publicly available video stream of the gameplay of the video game;

code for receiving, at the spectator computer, a user selection of at least one of the plurality of graphics options associated with at least one of the one or more temporal positions;

code for combining and synchronizing, at the spectator computer, the video stream and one or more portions of the metadata stream specifying the at least one of the plurality of graphics options associated with the user selection to generate a composite stream, the synchronizing using the at least one of the one or more temporal positions associated with the at least one of the plurality of graphics options associated with the user selection; and code for generating, at the spectator computer, a presentation based on the composite stream.

20. The computer program product of claim 19, wherein the method further comprises overlaying at least one of a plurality of graphics over at least a portion of the video of the gameplay, the at least one of the plurality of graphics being associated with the at least one of the plurality of graphic options associated with the user selection.

21. The computer program product of claim 20, wherein the plurality of graphics include text, telestrations, and ads.

22. The computer program product of claim 19, wherein the code for generating, at the spectator computer, the presentation based on the composite stream comprises code for displaying the presentation based on the composite stream.

23. The computer program product of claim 19, wherein the plurality of independent data streams further includes an audio stream, and the metadata stream identifies a plurality of audio segments.

24. The computer program product of claim 23, further comprising: code for combing and synchronizing at least one of the plurality of audio segments with the audio stream.

25. The computer program product of claim 24, wherein the audio stream is part of the video stream.

26. The computer program product of claim 19, wherein one of the plurality of graphics options includes a three dimensional model of a player in the video game.

27. The computer program product of claim 19, wherein the video stream is of a recorded event or a live event.

* * * * *